United States Patent
Gassho

(10) Patent No.: US 7,136,486 B2
(45) Date of Patent: Nov. 14, 2006

(54) PRINT SYSTEM AND PRINTER CAPABLE OF PREVENTION OF UNJUST COPY PRINT

(75) Inventor: Kazuhito Gassho, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 696 days.

(21) Appl. No.: 09/938,516

(22) Filed: Aug. 27, 2001

(65) Prior Publication Data

US 2002/0064280 A1 May 30, 2002

(30) Foreign Application Priority Data

| Sep. 11, 2000 | (JP) | ............................ 2000-275079 |
| Sep. 11, 2000 | (JP) | ............................ 2000-275125 |
| Sep. 11, 2000 | (JP) | ............................ 2000-275509 |

(51) Int. Cl.
- H04L 15/34 (2006.01)
- H04L 9/00 (2006.01)
- H04N 1/44 (2006.01)

(52) U.S. Cl. .................... 380/51; 380/243; 713/179
(58) Field of Classification Search ............ 380/51, 380/243; 713/179
See application file for complete search history.

(56) References Cited

U.S. PATENT DOCUMENTS

| 6,086,706 A | 7/2000 | Brassil et al. |
| 6,378,070 B1* | 4/2002 | Chan et al. .................. 713/155 |
| 6,654,501 B1* | 11/2003 | Acharya et al. ............ 382/235 |
| 6,711,677 B1* | 3/2004 | Wiegley ..................... 713/151 |
| 6,801,999 B1* | 10/2004 | Venkatesan et al. ........ 713/167 |
| 6,807,285 B1* | 10/2004 | Iwamura ...................... 382/100 |
| 6,912,374 B1* | 6/2005 | Clough et al. ............. 455/41.2 |

FOREIGN PATENT DOCUMENTS

| JP | 05-216602 | 8/1993 |
| JP | 06-124178 | 5/1994 |
| JP | A 9-297510 | 11/1997 |
| JP | 11-203075 | 7/1999 |
| JP | 11-227298 | 8/1999 |
| JP | 11-327861 | 11/1999 |
| JP | 2000-010929 | 1/2000 |
| JP | 2000-172648 | 6/2000 |
| JP | 2000-181652 | 6/2000 |
| JP | 2001-111541 | 4/2001 |
| JP | 2001-117822 | 4/2001 |
| JP | 2001-258008 | 9/2001 |
| JP | 2001-346182 | 12/2001 |
| JP | 2002-026895 | 1/2002 |

OTHER PUBLICATIONS

Abstract of Japanese Patent Publication No. 05-216602, Pub. Date: Aug. 27, 1993, Patent Abstracts of Japan.

(Continued)

Primary Examiner—Ayaz Sheikh
Assistant Examiner—Kaveh Abrishamkar
(74) Attorney, Agent, or Firm—Martine Penilla & Gencarella, LLP

(57) ABSTRACT

Content data (CD) and printer specifying information (PI) generated by encrypting a printer identifier to specify a printer capable of printing this content data (CD) are included in print job data to be transmitted from a content server (44) to a printer (36). The printer (36) which has received the print job data reads and decrypts the printer specifying information (PI) included in the print job data and judges whether the printer identifier included therein coincides with its own printer identifier or not. Only when both printer identifiers coincide, print of the print job data is executed. Hence, unjust copy print of content data can be prevented.

37 Claims, 21 Drawing Sheets

OTHER PUBLICATIONS

Abstract of Japanese Patent Publication No. 06-124178, Pub. Date: May 6, 1994, Patent Abstracts of Japan.

Abstract of Japanese Patent Publication No. 11-203075, Pub. Date: Jul. 30, 1999, Patent Abstracts of Japan.

Abstract of Japanese Patent Publication No. 11-227298, Pub. Date: Aug. 24, 1999, Patent Abstracts of Japan.

Abstract of Japanese Patent Publication No. 11-327861, Pub. Date: Nov. 30, 1999, Patent Abstracts of Japan.

Abstract of Japanese Patent Publication No. 2000-010929, Pub. Date: Jan. 14, 2000, Patent Abstracts of Japan.

Abstract of Japanese Patent Publication No. 2000-172648, Pub. Date: Jun. 23, 2000, Patent Abstracts of Japan.

Abstract of Japanese Patent Publication No. 2000-181652, Pub. Date: Jun. 30, 2000, Patent Abstracts of Japan.

Abstract of Japanese Patent Publication No. 2001-111541, Pub. Date: Apr. 20, 2001, Patent Abstracts of Japan.

Abstract of Japanese Patent Publication No. 2001-117822, Pub. Date: Apr. 27, 2001, Patent Abstracts of Japan.

Abstract of Japanese Patent Publication No. 2001-346182, Pub. Date: Dec. 14, 2001, Patent Abstracts of Japan.

Abstract of Japanese Patent Publication No. 2001-258008, Pub. Date: Sep. 21, 2001, Patent Abstracts of Japan.

Abstract of Japanese Patent Publication No. 2002-026895, Pub. Date: Jan. 25, 2002, Patent Abstracts of Japan.

* cited by examiner

PRINT SYSTEM AND PRINTER CAPABLE OF PREVENTION OF UNJUST COPY PRINT

BACKGROUND OF THE INVENTION

1. Field of the Invention

The present invention relates to a print system, a printer, and a content server.

2. Description of the Related Art

These days, public networks such as Internet have become widespread explosively. Therefore, ordinary users have come to be able to download content data from a content server distant from the users via the Internet and print this data by their own printers.

For example, when a content server connected to Internet collects data on photographs of professional entertainers in a content database, a user can access the content server which manages this content database via the Internet. Then the user can download a photograph of an entertainer he or she wants from the content database to his or her own computer and print it by a printer connected to this computer. On the occasion of this download, a provider who provides the content server charges the user suitably for it, whereby a service business pays.

However, a mechanism to prevent unjust copy print is not provided in content data on photographs and the like downloaded from the content server by the user. Accordingly, the user can print the content data downloaded from the content server by the printer any number of times. In this case, it can not be said that a copyright on the content data is sufficiently protected.

SUMMARY OF THE INVENTION

The present invention is made in view of the aforesaid problem, and an object of the present invention is to provide a print system in which a user can print downloaded content data by a printer and can not copy-print this content data unjustly.

In order to accomplish the aforementioned and other objects, according to one aspect of the present invention, a print system including a printer and a content server connected to the printer via a network, comprising:

a content database for the content server which collects a plurality of kinds of content original data;

a reader which, in the content server, reads content original data of a kind selected by a user as content data from the content database;

a printer specifying information requester which gives a request for transmission of printer specifying information including a printer identifier to specify the printer to the printer which is transmitted the content data read by the reader from the content server;

a printer specifying information transmitter which transmits the printer specifying information including the printer identifier from the printer to the content server based on the request from the printer specifying information requester;

a print job data generator which, in the content server, generates print job data including at least the content data and the printer specifying information based on the content data read by the reader and the received printer specifying information;

a print job data transmitter which transmits the print job data from the content server to the printer;

a print job data receiver which receives the print job data transmitted from the content server to the printer;

a judging portion which, in the printer, reads the printer identifier included in the printer specifying information of the print job data and judges whether the printer identifier coincides with its own printer identifier; and a print executor which executes print of the print job data in the printer only when the judging portion judges that the printer identifier included in the print job data coincides with its own printer identifier.

According to another aspect of the present invention, a printer connected to a content server via a network, comprising:

a printer specifying information transmitter which transmits printer specifying information including a printer identifier to specify the printer based on a request from the content server;

a receiver which receives print job data having at least content data and the print specifying information including the printer identifier from the content server;

a judging portion which reads the printer identifier included in the printer specifying information of the print job data and judges whether this printer identifier coincides with its own printer identifier or not; and a print executor which executes print of the print job data only when the judging portion judges that the printer identifier included in the print job data coincides with its own printer identifier.

According to a further aspect of the present invention, a content server connected to a printer via a network, comprising:

a content database which collects a plurality of kinds of content original data;

a reader which reads content original data of a kind selected by a user as content data from the content database;

a printer specifying information requester which requests transmission of printer specifying information including a printer identifier to specify the printer from the printer which is transmitted the content data read by the reader;

a printer specifying information receiver which receives the printer specifying information from the printer;

a print job data generator which generates print job data including at least the content data and the printer specifying information based on the content data read by the reader and the received printer specifying information; and a print job data transmitter which transmits the print job data to the printer.

DETAILED DESCRIPTION OF THE INVENTION

[First embodiment]

In a print system according to the present invention, when image data is downloaded as print job data from a content server via Internet, copy guard codes are inserted into the print job data so that normal print can not be performed, and when a printer prints this print job data, a decrypting key necessary to remove the copy guard codes is transmitted from the content server to the printer. By incorporating printer specifying information to specify a printer capable of printing this print job data in the first copy guard code, only the specified printer can print the print job data. Thus, a copyright on the image data can be protected appropriately. This will be explained below in detail.

Figure 1:
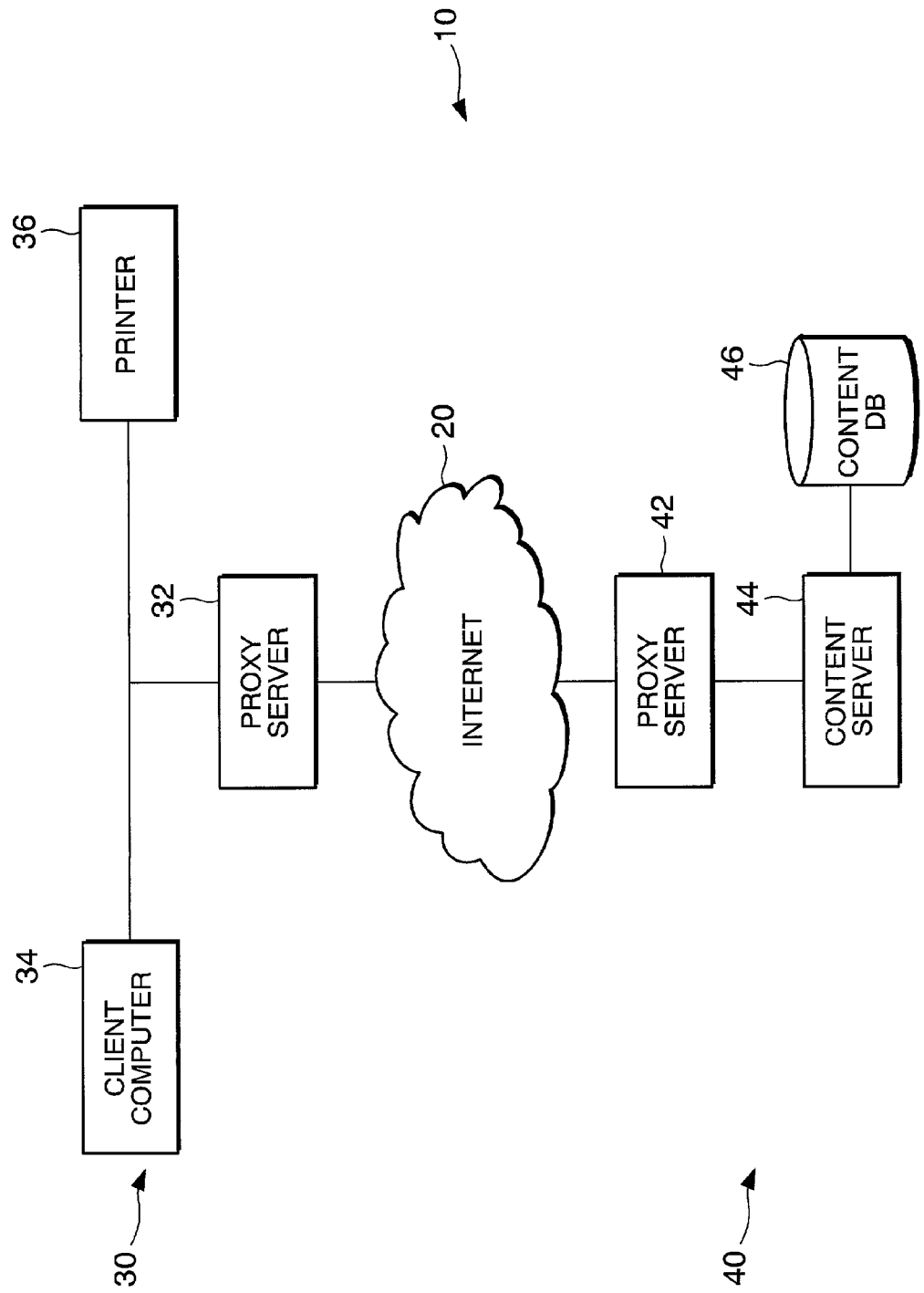
FIG. 1 is a diagram showing an example of a hardware configuration of a print system according to a first and a second embodiment of the present invention.

First of all, the configuration of a print system according to this embodiment will be explained based on FIG. 1. FIG. 1 is a schematic block diagram showing the configuration of the print system according to this embodiment.

As shown in FIG. 1, a print system 10 according to this embodiment comprises a local area network (LAN) 30 connected to Internet 20 and a content providing system 40 also connected to the Internet 20. The Internet 20 is an example of public networks and the most widespread computer public network nowadays.

The local area network 30 is connected to this Internet 20 via a proxy server 32. This local area network 30 is composed of Ethernet, for example, and comprises a client computer 34 and a printer 36. Print job data transmitted from the client computer 34 is received by the printer 36 via the local area network 30 and printed. Various kinds of data received from the Internet 20 via the proxy server 32 are received by the client computer 34 or the printer 36. Especially the print job data received by the printer 36 from the Internet 20 via the proxy server 32 can be printed as received by this printer 36.

The content providing system 40 is also connected to the Internet 20 via a proxy server 42. In this content providing system 40, a content server 44 is connected to the proxy server 42 and has a content database 46. In this embodiment, one or a plurality of photographs of professional entertainers are stored as one or a plurality of digital image data in the content database 46.

As can be seen from the aforesaid configuration, in the print system 10 shown in FIG. 1, it is possible that the printer 36 fetches the image data stored in the content database 46 as print job data via the Internet 20 and print it. This embodiment is designed to prevent unjust copy print when the printer 36 prints this image data.

Figure 2:
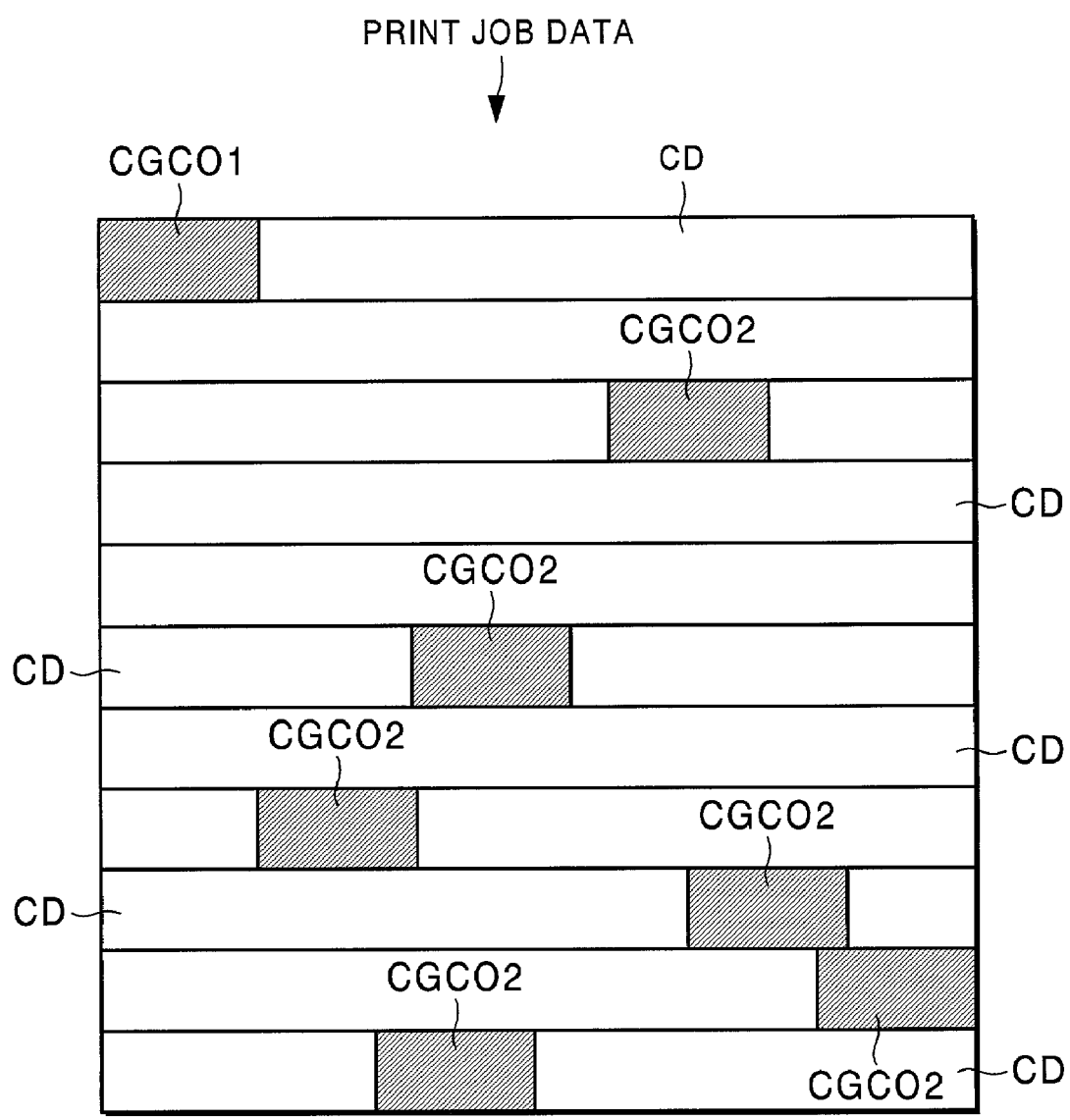
FIG. 2 is a diagram showing an example of the structure of print job data according to the first embodiment of the present invention.

Next, based on FIG. 2, an example of a print job data structure of the image data to be transmitted from the content server 44 to the printer 36 will be explained. FIG. 2 is a diagram showing an example of the structure of print job data which the content server 44 generates to transmit the image data to the printer 36.

As shown in FIG. 2, in the print job data, a copy guard code CGCO1 is inserted at the head thereof, and copy guard codes CGCO2 are dispersively inserted randomly in content data CD. The content data CD is original data indispensable to print the image data. The copy guard codes CGCO1 and CGCO2 are data for the prevention of unjust copy print so that print can be executed normally by the printer 36 or other printers after these copy guard codes are removed. In this embodiment, the copy guard code CGCO1 always exists at the heat of the print job data. The copy guard codes CGCO2 are studded randomly in the content data CD, whereby unjust copy print is not performed by the printer 36 or the other printers. The copy guard codes CGCO2 are inserted randomly as required according to the data length of the content data CD. Namely, depending on the data length of the content data, in the print job data, no copy guard code CGCO2 may exist, only one copy guard code CGCO2 may exist, or a plurality of copy guard codes CGCO2 may exist.

Figure 3A:
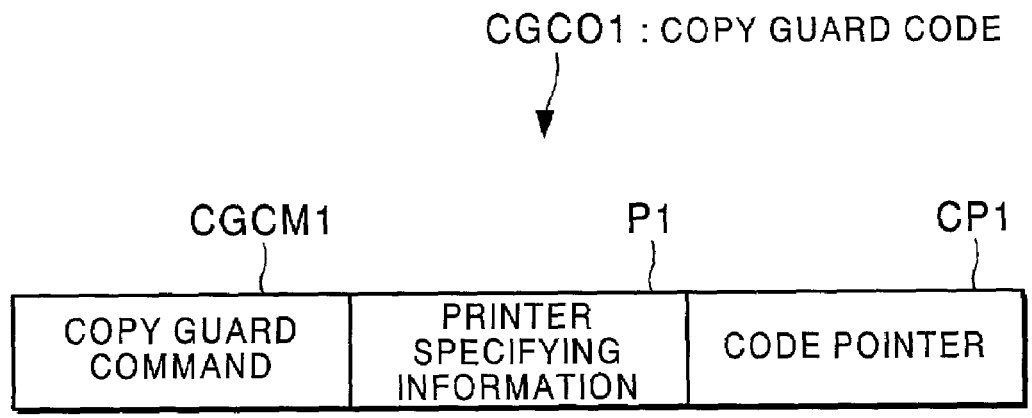
FIG. 3A is a diagram showing an example of the structure of a copy guard code located at the head of the print job data according to the first embodiment of the present invention.
Figure 3B:
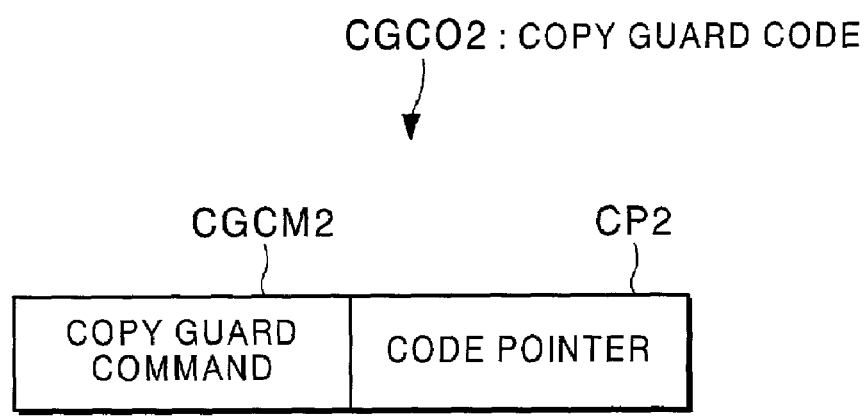
FIG. 3B is a diagram showing an example of the structure of a copy guard code located in the print job data according to the first embodiment of the present invention.

FIG. 3A is a diagram showing a data structure of the copy guard code CGCO1 according to this embodiment, and FIG. 3B is a diagram showing a data structure of the copy guard code CGCO2.

As shown in FIG. 3A, the copy guard code CGCO1 includes a copy guard command CGCM1, printer specifying information PI, and a code pointer CP1.

The copy guard command CGCM1 is a command indicating that for several bytes after this, data on the copy guard code CGCO1 is stored. In this embodiment, this copy guard command CGCM1 is not encrypted at all.

The printer specifying information PI is information to specify a printer capable of printing the print job data. In this explanation, information to specify the printer 36 so that the print job data can be printed by only the printer 36 but not by other printers is stored. Moreover, this printer specifying information PI is generated by the printer 36, and more specifically generated by the encrypting of its own printer identifier by the printer 36 itself and transmitted to the content server 44. Accordingly only the printer 36 can decrypt the printer specifying information PI.

The code pointer CP1 is a pointer indicating a position where the next copy guard code CGCO2 is stored. It is determined that the copy guard code CGCO1 is stored at the head of the print job data, but the positions of the subsequent copy guard codes CGCO2 to be stored in the print job data are not determined, and they are determined randomly every time the copy guard codes CGCO2 are generated. Hence, the position of the next copy guard code CGCO2 is indicated by the copy guard code CGCO1 at the head by means of the code pointer CP1. In this embodiment, the code pointer CP1 is generated after being encrypted by the content server 44. Therefore, even if the printer 36 receives the print job data, the printer 36 can not obtain information on this code pointer CP1 unless it receives a code pointer decrypting key to decrypt the print job data from the content server 44. Accordingly, the code pointer decrypting key is a protection removing key in this embodiment.

As shown in FIG. 3B, the copy guard codes CGCO2 which are the second and subsequent copy guard codes each include a copy guard command CGCM2 and a code pointer CP2.

The copy guard command CGCM2 is a command indicating that for several bytes after this, data on the copy guard code CGCO2 is stored.

The code pointer CP2 is a pointer indicating a position where the next copy guard code CGCO2 is stored. Namely, the position of the next copy guard code CGCO2 is indicated by the preceding copy guard code CGCO2 by means of the code pointer CP2.

In this embodiment, these copy guard commands CGCM2 and code pointers CP2 are not encrypted. This is because as long as the first code pointer CP1 is encrypted, since the insertion positions of the copy guard codes CGCO2 differ from one print job data to another, there is substantially little possibility that a third person specifies their positions even if the copy guard commands CGCM2 and the code pointers CP2 are not encrypted.

Incidentally, the copy guard codes CGCO1 and CGCO2 shown in FIG. 3A and FIG. 3B may include data items other than those shown in these figures, and the order of data items may be different from the order shown.

Figure 4:
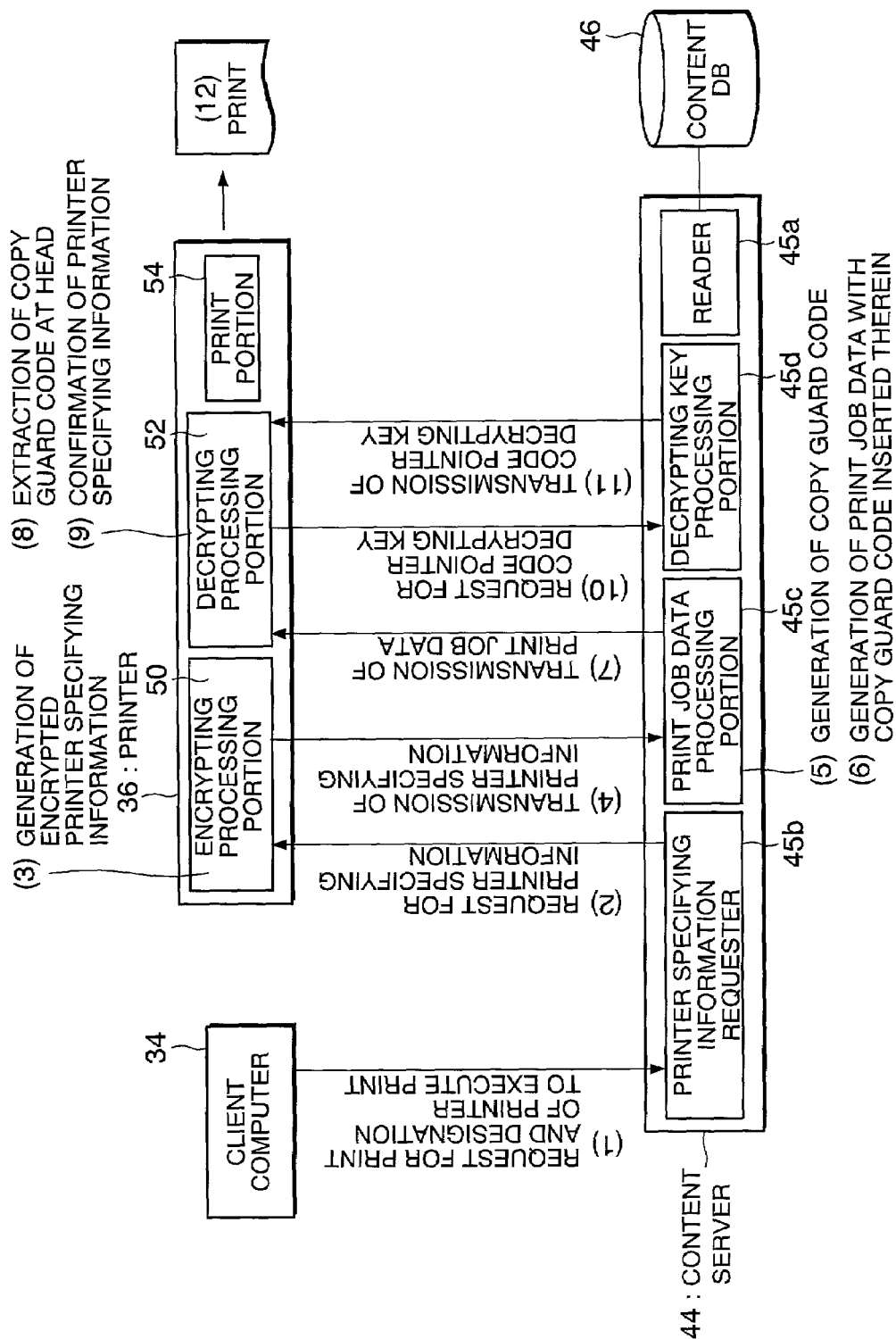
FIG. 4 is a block diagram schematically explaining the whole print processing in the print system according to the first embodiment of the present invention.

Next, print processing of image data in the print system 10 according to this embodiment will be explained schematically based on FIG. 4. FIG. 4 is a block diagram for sequentially explaining an example of data and commands transmitted and received between the client computer 34, the printer 36, and the content server 44 when the printer 36 prints the image data.

As shown in FIG. 4, a user accesses the content database 46 from the client computer 34 via the Internet 20. The user specifies image data which he or she wishes to print out of plural kinds of image data collected in the content database 46. The image data is read from the content database 46 by a reader 45a. Subsequently, the user (1) transmits a request for print of the image data and information that the printer 36 is designated as a printer to execute print to the content server 44 via the Internet 20.

In the content server 44 which has received the image data print request and the designation of the printer to execute print, (2) a printer specifying information requester 45b requests the printer specifying information PI to specify the printer from the printer 36 designated as the printer to execute print.

The printer 36 which has received the request for the printer specifying information PI (3) generates the encrypted printer specifying information PI in a encrypting processing portion 50. In this embodiment, the printer 36 generates the printer specifying information PI by encrypting a printer identifier to distinguish the printer 36 from other printers with the printer's own ID and information assigned to the printer 36 by an operator of the printer 36. Therefore, these printer's own ID and information assigned to the printer 36 arbitrarily by the operator compose a printer decrypting key to decrypt the printer specifying information PI. Moreover, in this embodiment, a MAC (Media Access Control) address is used as the printer identifier to distinguish the printer 36 from other printers. The MAC address is a peculiar address assigned to a LAN card connected to Ethernet at the time of fabrication. Subsequently, the encrypting processing portion 50 of the printer 36 (4) transmits the generated printer specifying information PI to the content server 44 via the Internet 20.

The content server 44 which has received the printer specifying information PI, in a print job data processing portion 45c, (5) generates the copy guard code CGCO1 (See FIG. 3A) using the printer specifying information PI, and generates the copy guard codes CGCO2 (See FIG. 3B) subsequent to the copy guard code CGCO1. Then, (6) the copy guard codes CGCO1 and CGCO2 are inserted appropriately in the content data CD to generate print job data (See FIG. 2). The positions where the copy guard codes CGCO2 are inserted in the content data CD are determined randomly by random numbers every time print job data is generated. The print job data processing portion 45c of the content server 44 (7) transmits the generated print job data to the printer 36 via the Internet 20.

The printer 36 which has received the print job data, in a decrypting processing portion 52, (8) extracts the copy guard code CGCO1 from the head of the print job data. The printer 36 then (9) reads the printer specifying information PI from the copy guard code CGCO1 and confirms whether this print job data is print job data generated for the printer 36 or not. Specifically, in the decrypting processing portion 52, whether or not the received printer specifying information PI can be decrypted by a printer decrypting key composed of an ID of the printer's own and information assigned to the printer 36 by the operator is confirmed, and when it can be decrypted, whether or not a printer identifier obtained by decrypting is that of the printer 36 itself is confirmed. When the printer identifier obtained by decrypting is that of the printer 36 itself, (10) the printer 36 requests a code pointer decrypting key from the content server 44 via the Internet 20. On the other hand, when the decrypted printer identifier is not that of the printer 36 itself or when the specifying information can not be decrypted, the printer 36 ends this print processing without requesting the code pointer decrypting key. Hence, even if the printer 36 receives print job data for other printers, it can not print this print job data.

The request for the code pointer decrypting key transmitted from the printer 36 is received by a decrypting key processing portion 45*d* of the content server 44. The decrypting key processing portion 45*d* then (11) transmits the code pointer decrypting key to the printer 36 via the Internet 20. The printer 36 which has received this code pointer decrypting key extracts the code pointer CP1 included in the copy guard code CGCO1 and decrypts it with the code pointer decrypting key in the decrypting processing portion 52. As a result of this decrypting, the position of the second copy guard code CGCO2 is obtained. Then the copy guard code CGCO1 is extracted from the print job data and the print job data is transmitted to a print portion 54. Further, after the second and subsequent copy guard codes CGCO2 are extracted in sequence each based on position information indicated by the code pointer CP2 included in the preceding copy guard code CGCO2, the print job data is transmitted to the print portion 54. Thereby, (12) print is normally executed in the print portion 54.

The print processing in the print system 10 according to this embodiment is schematically explained above, and now individual processing in the content server 44 and the printer 36 will be explained in detail.

Figure 5:
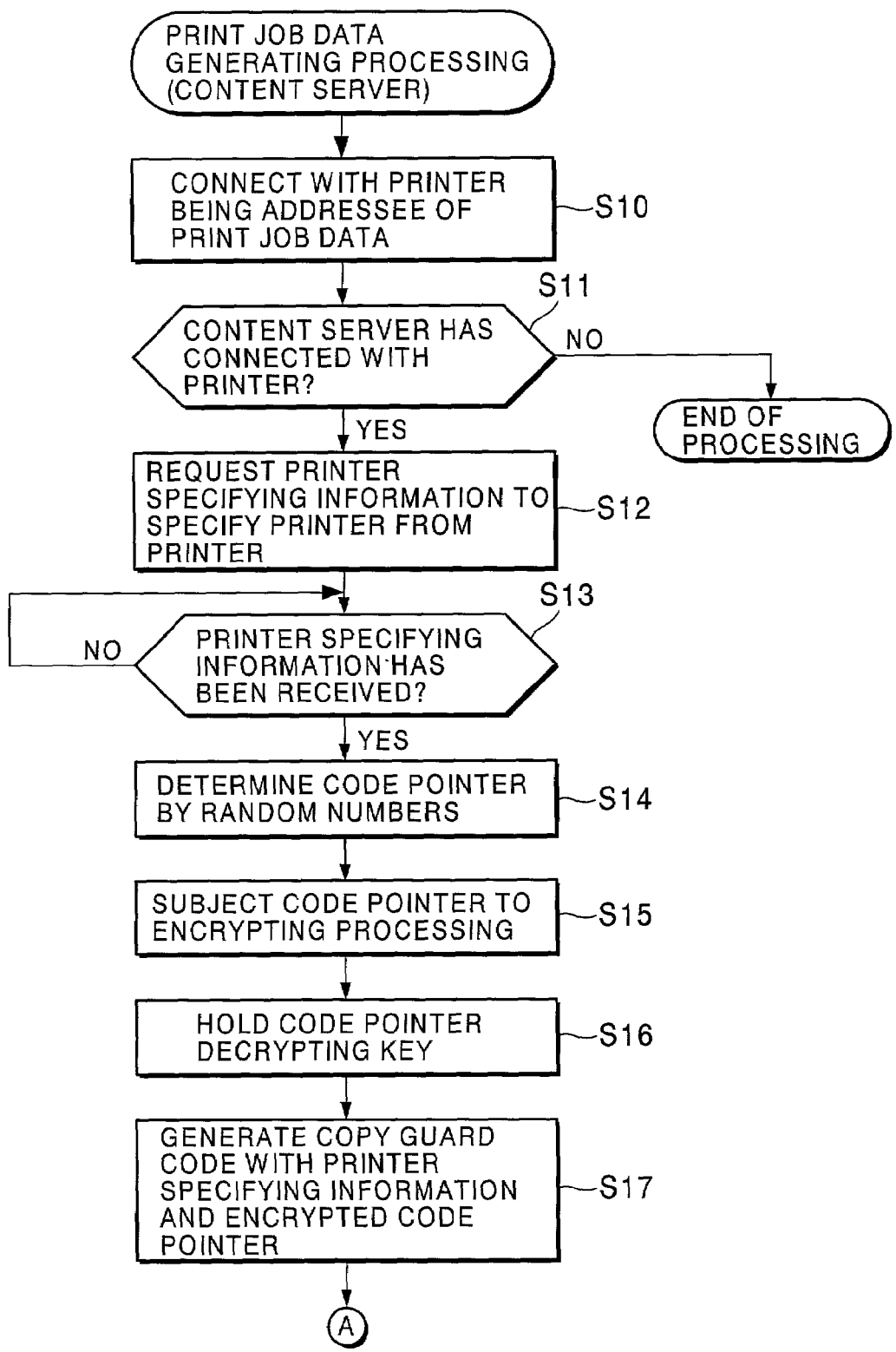
FIG. 5 is a flowchart explaining print job data generating processing executed in a content server according to the first embodiment of the present invention (a first flowchart)
Figure 6:
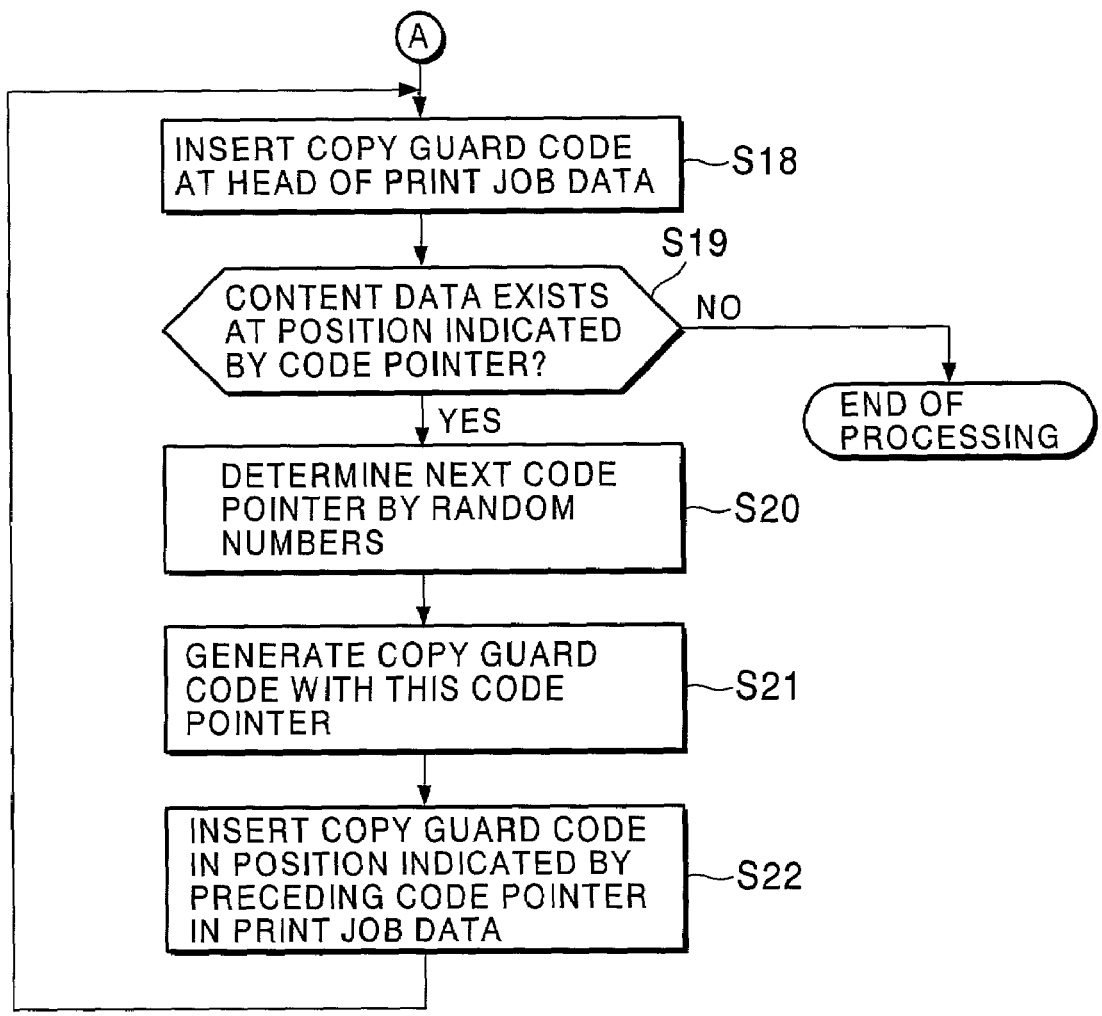
FIG. 6 is a flowchart explaining the print job data generating processing executed in the content server according to the first embodiment of the present invention (a second flowchart)

First, based on FIG. 5 and FIG. 6, print job data generating processing in the content server 44 will be explained. FIG. 5 and FIG. 6 are flowcharts explaining print job data generating processing executed by the content server 44 which has received the image data print request and designation of the printer to execute print from the client computer 34.

As shown in FIG. 5, the content server 44 is connected to the printer 36 which is an addressee of print job data via the Internet 20 (step S10). A printer to be connected to the content server can be specified by the designation of the printer to execute print transmitted from the content server 44.

Then the content server 44 judges whether it can be connected to the printer 36 to execute print or not (step S11). When not being connected to the printer 36 to execute print (step S11: No), the content server 44 ends this print job data generating processing.

Meanwhile, when being connected to the printer 36 to execute print (step S11: Yes), the content server 44 requests the printer specifying information PI to specify the printer from the printer 36 (step S12). The connection between the content server 44 and the printer 36 via the Internet 20 is maintained until this successive print processing is completed.

Subsequently, the content server 44 judges whether it has received the printer specifying information PI from the printer 36 or not (step S13), and when having not received it (step S13: No), the content server 44 stands by while repeating the processing in step S13.

On the other hand, when the content server 44 has received the printer specifying information PI from the printer 36 via the Internet 20 (step S13: Yes), the code pointer CP1 of the copy guard code CGCO1 to be inserted at the head of the print job data is determined by random numbers (step S14). Then the content server 44 subjects this generated code pointer CP1 to encrypting processing (step S15). On this occasion, the content server 44 holds the code pointer decrypting key necessary to decrypt the encrypted code pointer CP1 (step S16).

Thereafter, the content server 44 generates the copy guard code CGCO1 by adding the printer specifying information PI encrypted in the printer 36 and the code pointer CP1 encrypted in the content server 44 to the copy guard command CGCM1 (step S17).

Then, as shown in FIG. 6, the content server 44 inserts the generated copy guard code CGCO1 at the head of the print job data (step S18). In generating the print job data, the content data CD is generated based on image data collected in the content database 46. Namely, the content server 44 reads the image data selected by the user from the content database 46 and makes this image data the content data CD.

The content server 44 judges whether the content data CD exists at a position indicated by the code pointer CP1 generated in step S14 (step S19). When the content data CD does not exist at this position (step S19: No), the generation of the print job data on the image data designated by the user is completed, and thus the print job data generating processing ends.

Meanwhile, when the content data CD exists at the position indicated by the code pointer CP1 generated in step S14 (step S19: Yes), the next code pointer CP2 is determined by random numbers (step S20). Subsequently, the content server 44 generates the second copy guard code CGCO2 by adding the code pointer CP2 determined in this step S20 to the copy guard command CGCM2 (step S21). The copy guard code CGCO2 generated in this step S21 is inserted in the position indicated by the code pointer CP1 determined in step S14 (step S22). Then it returns to processing in the aforesaid step S18.

After this, the aforesaid processing from step S18 to step S22 is repeated. In the second and subsequent loops, however, in step S19, it is judged whether the content data CD exists at a position indicated by the code pointer CP2 determined by processing in the preceding step S20, and in step S22, the copy guard code CGCO2 is inserted in the position indicated by this code pointer CP2.

Figure 7:
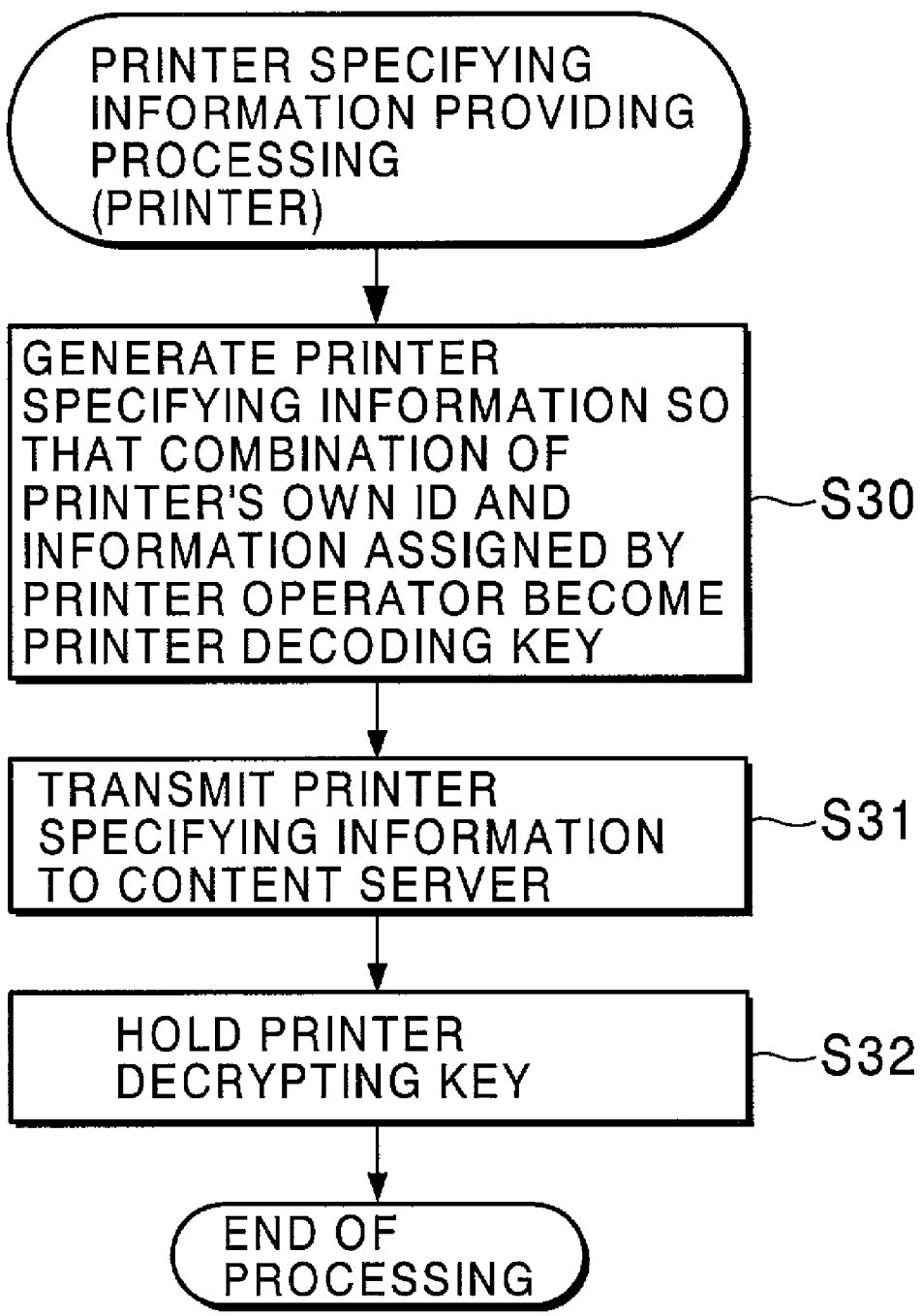
FIG. 7 is a flowchart explaining printer specifying information providing processing executed in a printer according to the first embodiment of the present invention.

Next, printer specifying information providing processing in the printer 36 will be explained based on FIG. 7. FIG. 7 is a flowchart explaining the printer specifying information providing processing executed by the printer 36 from which the content server 44 requests the printer specifying information PI. Namely, it is processing executed by the printer 36 based on the request for the printer specifying information PI in step S12 in FIG. 5.

First of all, the printer 36 encrypts a printer identifier to identify the printer 36 so that an ID of the printer's own and information assigned to the printer 36 arbitrarily by the operator of the printer 36 become a printer decrypting key to generate the printer specifying information PI (step S30). As stated above, in this embodiment, the MAC (Media Access Control) address is used as the printer identifier to distinguish the printer 36 from other printers.

The printer 36 then transmits the generated printer specifying information PI to the content server 44 via the Internet 20 (step S31). It holds the printer's own ID and the information assigned to this printer 36 by the operator of the printer 36 as the printer decrypting key (step S32). Thus, the printer specifying information providing processing according to this embodiment is completed.

Figure 8:
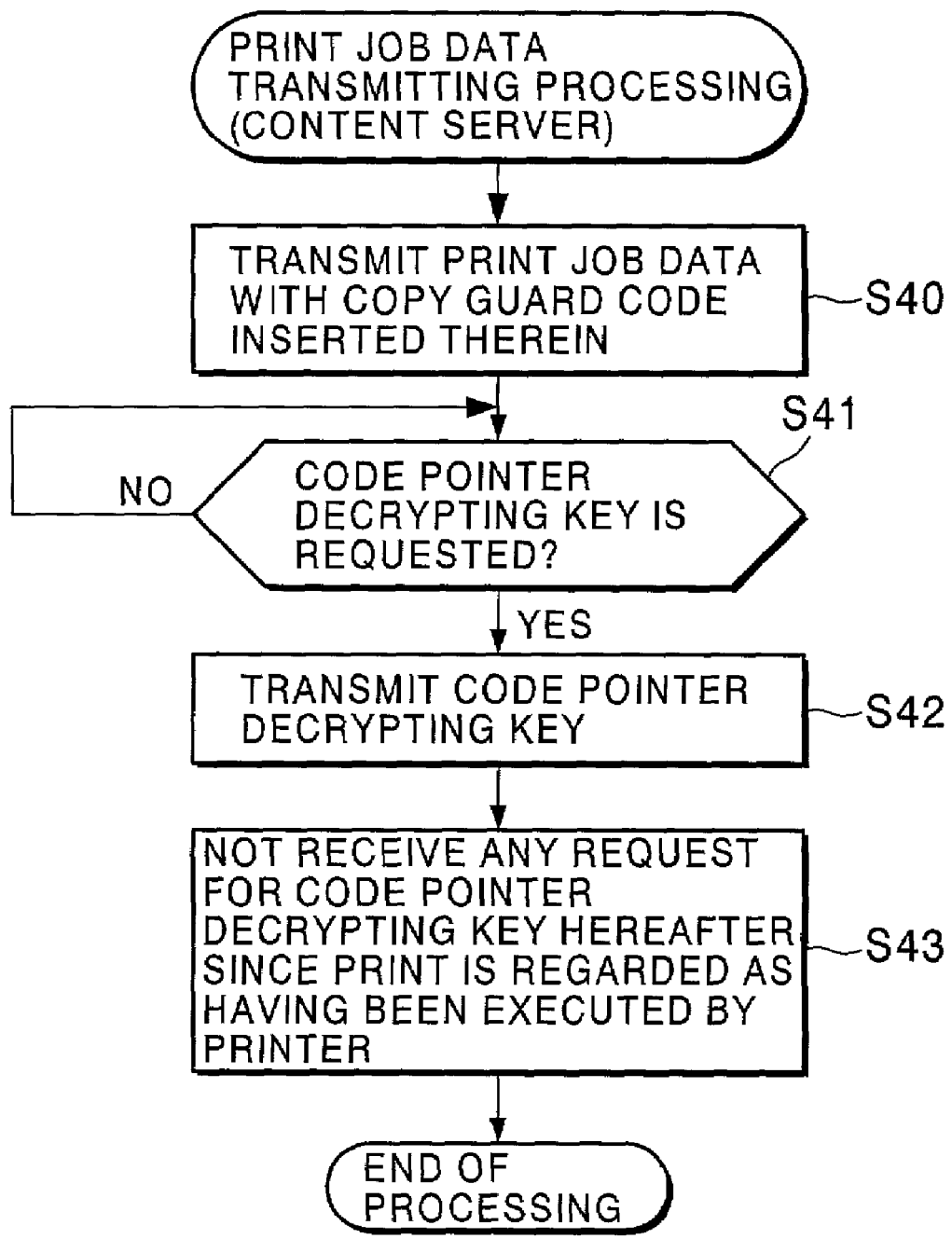
FIG. 8 is a flowchart explaining print job data transmitting processing executed in the content server according to the first embodiment of the present invention.

Next, print job data transmitting processing in the content server 44 will be explained based on FIG. 8. FIG. 8 is a flowchart explaining the print job data transmitting processing executed by the content server 44 which has completed the print job data generating processing shown in FIG. 5 and FIG. 6. Namely, this processing is executed by the content server 44 when it is judged in step S19 in FIG. 6 that the print job data is generated to the end of the image data.

First, as shown in FIG. 8, the content server 44 transmits the print job data, in which one copy guard code CGCO1 and one or more than one copy guard codes CGCO2 depending on the length of the image data are inserted, to the printer 36 via the Internet 20 (step S40). Subsequently, the content server 44 judges whether the transmission of the code pointer decrypting key is requested by the printer 36 or not (step S41). When the transmission of the code pointer decrypting key is not requested (step S41: No), the content server 44 stands by while repeating this processing in step S41.

Meanwhile, when the transmission of the code pointer decrypting key is requested by the printer 36 (step S41: Yes), the content server 44 transmits the code pointer decrypting key to the printer, including consent to print (step S42). Since the printer 36 is permitted to print this image data only once in this embodiment, when the code pointer decrypting key is transmitted in step S42, the content server 44 regards print by the printer 36 as having been executed by this transmission, and hence hereafter does not receive any transmission request even if any code pointer decrypting key transmitting request regarding this print job data is made by the printer 36. Accordingly, the printer 36 can print the received print job data only once.

Figure 9:
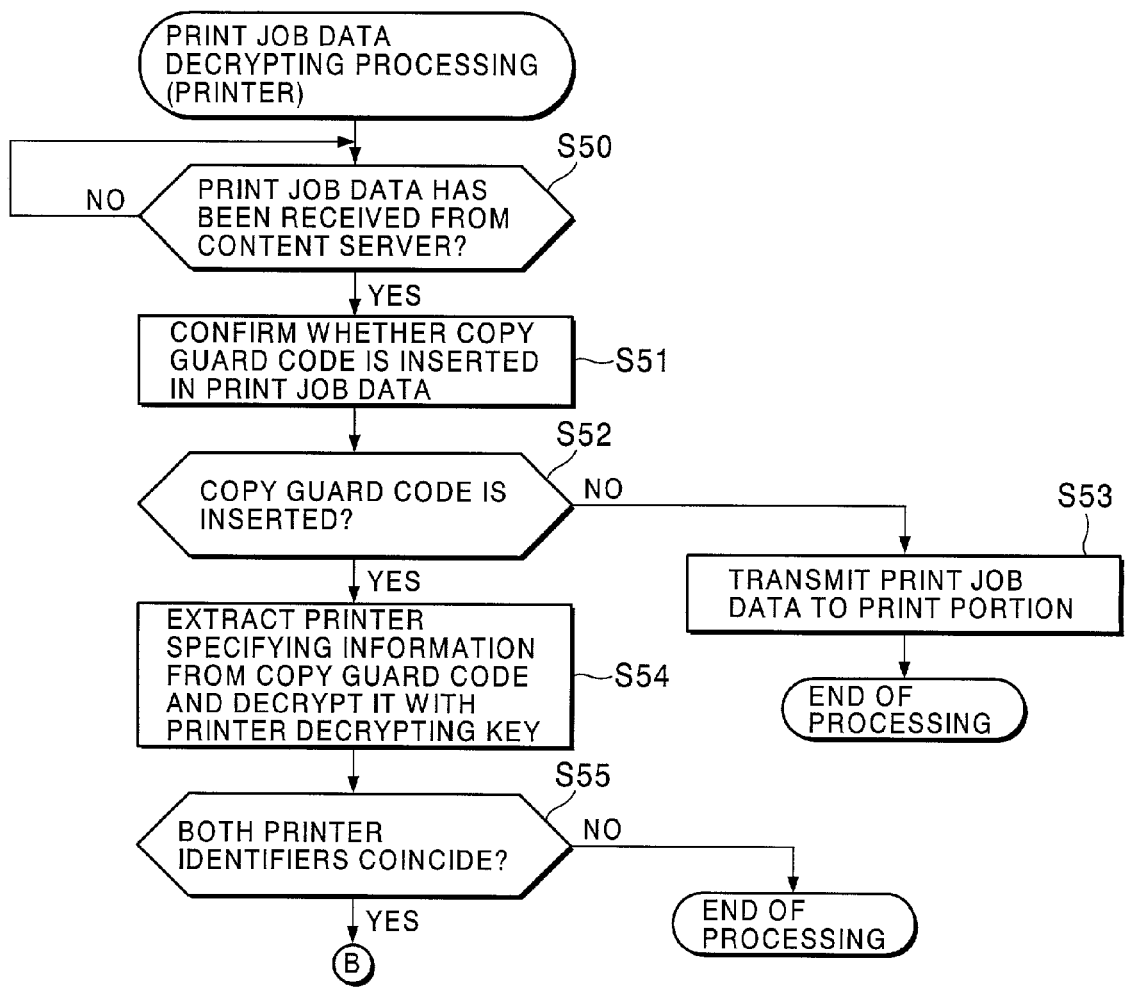
FIG. 9 is a flowchart explaining print job data decrypting processing executed in the printer according to the first embodiment of the present invention (a first flowchart)
Figure 10:
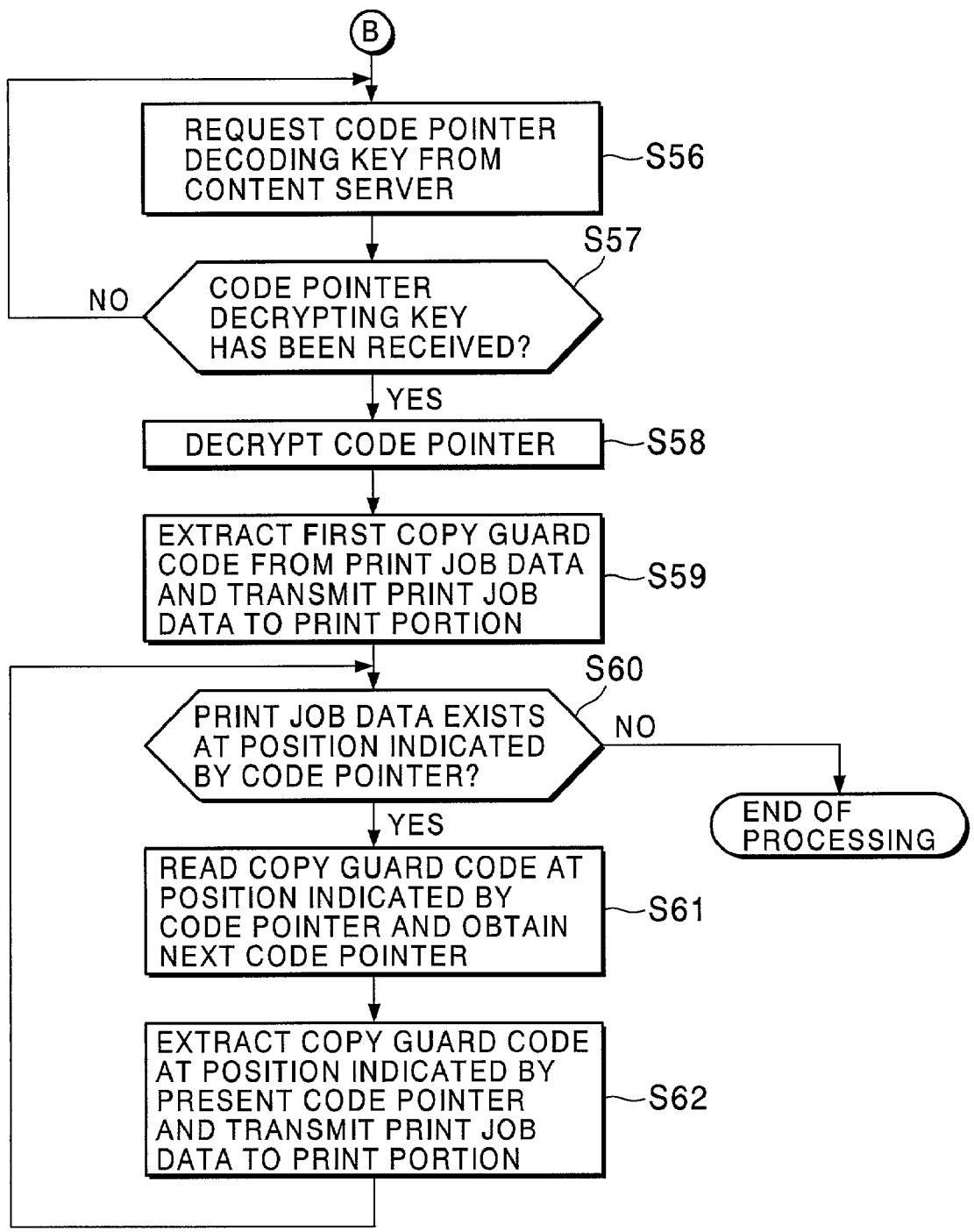
FIG. 10 is a flowchart explaining the print job data decrypting processing executed in the printer according to the first embodiment of the present invention (a second flowchart)

Next, print job data decrypting processing in the printer 36 will be explained based on FIG. 9 and FIG. 10. FIG. 9 and FIG. 10 are flowcharts explaining the print job data decrypting processing executed by the printer 36 which has completed the printer specifying information providing processing shown in FIG. 7. Namely, this processing is executed by the printer 36 after the printer holds the printer decrypting key in step S32 in FIG. 7.

First, as shown in FIG. 9, the printer 36 judges whether it has received the print job data from the content server 44 or not (step S50). When having not received the print job data (step S50: No), the printer 36 stands by while repeating the processing in step S50.

Meanwhile, when having received the print job data from the content server 44 (step S50: Yes), the printer 36 confirms whether the copy guard code CGCO1 is inserted in the print job data or not (step S51). More specifically, the printer 36 confirms whether the copy guard command CGCM1 exists at the head of the print job data or not. The case where the copy guard command CGCM1 exists shows that the copy guard codes CGCO1 and CGCO2 are inserted in this print job data.

When the copy guard code CGCO1 is not inserted (step S52: No), the print job data is ordinary print job data and hence transmitted as received to the print portion 54 (step S53). Thereby, ordinary print is executed.

On the other hand, when the copy guard code CGCO1 is inserted (step S52: Yes), the printer specifying information PI is extracted from the copy guard code CGCO1 at the head of the print job data and decrypted with the printer decrypting key held in step S32 (See FIG. 7). Namely, the printer specifying information PI is decrypted with the printer decrypting key composed of the printer's own ID and the information assigned to the printer 36 arbitrarily by the operator of the printer 36, and a printer identifier is obtained from the printer specifying information PI.

Thereafter, the printer 36 judges whether the printer identifier obtained by decrypting the printer specifying information PI coincides with its own printer identifier or not (step S55). When the printer identifier obtained by decrypting the printer specifying information PI does not coincide with its own printer identifier or when the printer specifying information can not be decrypted (step S55: No), this print job data is not generated for the printer 36, and hence the printer 36 ends this print job data decrypting processing.

Meanwhile, when the printer identifier obtained by decrypting the printer specifying information PI coincides with its own printer identifier (step S55: Yes), the printer 36 requests the code pointer decrypting key from the content server 44 via the Internet 20 as shown in FIG. 10 (step S56). The printer 36 judges whether it has received the code pointer decrypting key from the content server 44 or not (step S57), and when having not received it (step S57: No), it stands by until reception while repeating the processing in step S57.

When having received the code pointer decrypting key from the content server 44 (step S57: Yes), the printer 36 decrypts the code pointer CP1 of the copy guard code CGCO1 at the head of the print job data using the code pointer decrypting key (step S58). Thereby, the position of the second copy guard code CGCO2 is known.

The printer 36 then removes the copy guard code CGCO1 from the head of the print job data and transmits the print job data up to but excluding the second copy guard code CGCO2 to the print portion 54 (step S59). The printer 36 then judges whether the print job data exists at a position indicated by the code pointer CP1 decrypted in step S58 or not (step S60). The case where the print job data does not exist at this position (step S60: No) shows that after all the copy guard codes CGCO1 and CGCO2 are removed from the print job data received from the content server 44, the whole print job data is transmitted to the print portion 54, and hence the printer 36 ends this print job data decrypting processing.

When the print job data exists at the position indicated by the code pointer CP1 (step S60: Yes), the printer 36 reads the copy guard code CGCO2 at the position indicated by the code pointer CP1 and obtains its code pointer CP2 (step S61).

Subsequently, the printer 36 removes the copy guard code CGCO2 read in step S61 and transmits the print job data up to but excluding the position indicated by the code pointer of this copy guard code CGCO2 to the print portion 54 (step S62). Then, it returns to step S60.

After this, the aforesaid processing from step S60 to step S62 is repeated. In the second and subsequent loops, however, in step S60, it is judged whether the print job data exists at a position indicated by the code pointer CP2 obtained in the last step S61. In step S61, a code pointer CP2 of the next copy guard code CGCO2 is obtained at a position indicated by the code pointer CP2 obtained in the last step 61. Subsequently, in step S62, the copy guard code CGCO2 is removed from the position indicated by the code pointer CP2 obtained in the step S61 before last and then the print job data is transmitted to the print portion 54 (step S62).

As stated above, according to the print system 10 related to this embodiment, when the printer 36 prints the print job data on the image data transmitted from the content server 44, only the printer 36 can print this data only once, whereby unjust copy print of image data collected in the content database 46 can be prevented.

Specifically, the printer specifying information PI including the printer identifier of the printer 36 is included in the print job data transmitted from the content server 44 to the printer 36. Only when printer identifiers coincide, the printer can print the print job data. Therefore, even if printers other than the printer 36 receive this print job data, they can not print this data.

Moreover, the printer specifying information PI can be decrypted only by the printer decrypting key being a combination of the ID peculiar to the printer 36 and information assigned arbitrarily by the operator of the printer 36, whereby even if printers other than the printer 36 acquire this print job data, they can not decrypt the printer specifying information PI.

Even in a printer without such a mechanism of preventing unjust copy print, the copy guard code CGCO1 is inserted at the head of print job data, whereby only a print result which does not make sense can be obtained even if the print job data is printed in the state it is in by the printer without such a mechanism.

Moreover, the position of the copy guard code CGCO1 at the head is fixed, while the positions of the second and subsequent copy guard codes CGCO2 differ randomly from one print job data to another, and hence a normal print result can not be obtained if only the copy guard code CGCO1 at the head is removed.

Even if a dishonest third person tries to decrypt the copy guard code CGCO1 located at the head, the positions of the second and subsequent copy guard codes CGCO2 can not be known since the code pointer CP1 is encrypted. Therefore, even if the copy guard code CGCO1 is removed by any means, the content data CD subsequent to the second copy guard code CGCO2 can not be printed normally.

Besides, the second and subsequent copy guard codes CGCO2 are studded everywhere in the print job data, whereby even if he or she tries to divide the print job data into a plurality of packets and acquire normal content data CD in each packet unjustly, the normal content data CD can not be acquired easily.

Furthermore, since a simple and easy method of inserting the copy guard codes CGCO1 and CGCO2 in the content data CD is used as a method for preventing unjust copy of image data, processing executed for obtaining a normal print result in the printer 36 is only simple processing of removing these copy guard codes CGCO1 and CGCO2 from the received print job data. Consequently, data processing does not take much time, and hence a processing burden imposed on the printer 36 can be lightened.

The code pointer decrypting key which functions also as print permission is transmitted only once from the content server 44 to the printer 36, which can prevent a plurality of copies of image data from being printed unjustly by the printer 36. Moreover, the printer 36 is designed to transmit a request for the code pointer decrypting key only when the printer identifier included in the printer specifying information PI coincides with its own printer identifier. Accordingly, only when an addressee of the print job data generated by the content server 44 coincides with a printer which actually executes print, the code pointer decrypting key can be requested and obtained.

It should be noted that this embodiment is not limited to the above explanation but can be modified variously. For example, although it is explained in FIG. 3 that the code pointers CP2 of the second and subsequent copy guard codes CGCO2 are not encrypted, they may be encrypted so as not to be decrypted without using the code pointer decrypting key.

Further, although it is explained in the aforesaid embodiment that the copy guard command CGCM2 is not encrypted, it may be encrypted. In this case, as a decrypting key, the code pointer decrypting key may be also used or another decrypting key may be used. When another decrypting key is used, the printer 36 needs to obtain this decrypting key in addition from the content server 44.

The positions of the second and subsequent copy guard codes CGCO2 are pinpointed by the preceding copy guard code CGCO1 or copy guard code CGCO2. Therefore, the copy guard command CGCM2 can be omitted from the data structure.

Furthermore, as for the second and subsequent copy guard codes CGCO2, the printer specifying information PI is not provided from a data structural viewpoint, but the printer specifying information PI may be provided. In this case, the printer 36 may confirm for each copy guard code CGCO2 whether the print job data is print job data for the printer 36 itself or not.

Moreover, although the printer specifying information PI can be decrypted by the printer decrypting key composed of the printer's own ID and the information assigned to the printer 36 arbitrarily by the operator in the aforesaid embodiment, it is possible that the printer specifying information PI is encrypted and decrypted by either one. However, when the printer specifying information PI can not be decrypted until two pieces of information, the printer's own ID and the information assigned to the printer 36 by the operator, coincide, the difficulty of decrypting the printer specifying information PI is increased. Contrary to this, the printer identifier of the printer 36 may be transmitted as printer specifying information from the printer 36 to the content server 44 without being encrypted. This is because even if the printer specifying information PI is not generated by encrypting the printer identifier, the print job data can not be printed by printers other than the printer specified by the content server 44 unless the third person manipulates the print job data with dishonest intention.

[Second embodiment]

In the second embodiment of the present invention, a copyright on image data can be protected appropriately by encrypting the whole content data which is the image data by the content server 44 and transmitting a content data decrypting key to decipher the encryption from the content server 44 to only the printer 36 in which the printer specifying information PI included in a copy guard code coincides. This will be explained below in detail.

Incidentally, the configuration of the print system 10 according to this embodiment is the same as that in the aforesaid first embodiment in FIG. 1, and hence the detailed explanation thereof is omitted.

Figure 11:
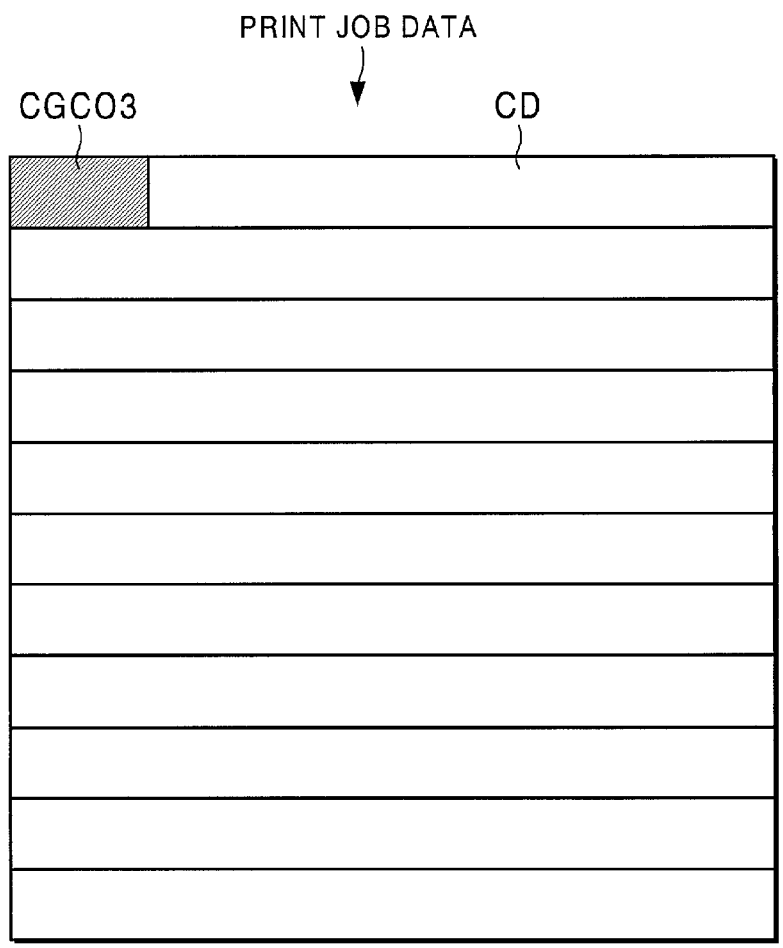
FIG. 11 is a diagram showing an example of the structure of print job data according to the second embodiment of the present invention.

First of all, based on FIG. 11, an example of a print job data structure of image data to be transmitted from the content server 44 to the printer 36 will be explained. FIG. 11 is a diagram showing an example of the structure of print job data which the content server 44 generates to transmit the image data to the printer 36.

As shown in FIG. 11, a copy guard code CGCO3 is inserted at the head of the print job data, and content data CD subsequent to this is encrypted. The encrypted content data CD can not be decrypted unless a content data decrypting key as its decrypting key is obtained from the content server 44. Accordingly, the insertion of only one copy guard code CGCO3 at the head is sufficient in this embodiment. This content data decrypting key is a protection removing key in this embodiment.

Figure 12:
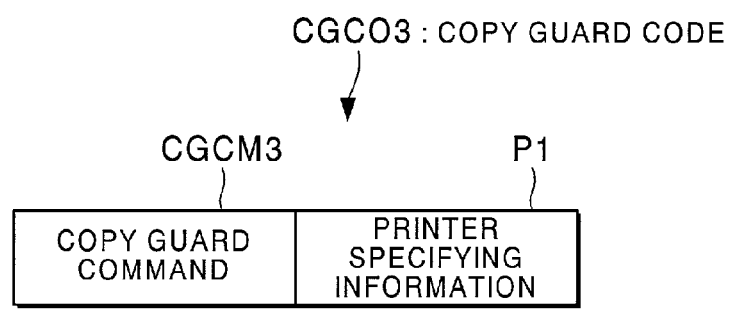
FIG. 12 is a diagram showing an example of the structure of a copy guard code according to the second embodiment of the present invention.

FIG. 12 is a diagram showing an example of a data structure of the copy guard code CGCO3 according to this embodiment. As shown in FIG. 12, the copy guard code CGCO3 includes a copy guard command CGCM3 and the printer specifying information PI.

The copy guard command CGCM3 is a command indicating that for several bytes after this, data on the copy guard code CGCO3 is stored. In this embodiment, this copy guard command CGCM3 is not encrypted at all.

The printer specifying information PI is information to specify a printer capable of printing this print job data as in the first embodiment. In this explanation, information to specify the printer 36 so that the print job data can be printed by only the printer 36 but not by other printers is stored. Moreover, this printer specifying information PI is generated by the printer 36, and more specifically generated by the encrypting of its own printer identifier by the printer 36 itself and transmitted to the content server 44. Accordingly, only the printer 36 can decrypt the printer specifying information PI.

Incidentally, the copy guard code CGCO3 shown in FIG. 12 may include data items other than those shown in this figure, and the order of data items may be different from the order shown.

Figure 13:
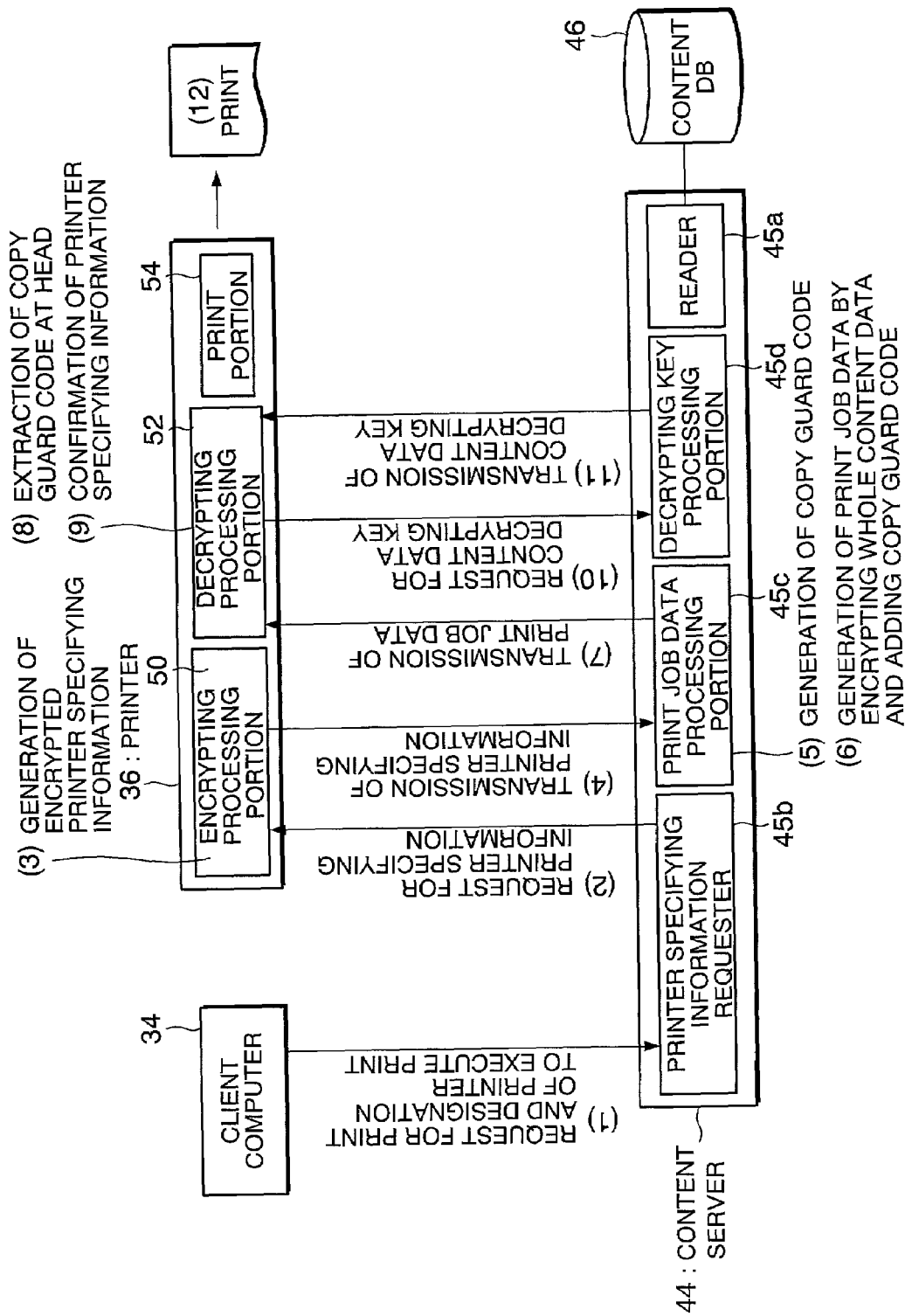
FIG. 13 is a block diagram schematically explaining the whole print processing in the print system according to the second embodiment of the present invention.

Next, print processing of image data in the print system 10 according to this embodiment will be explained schematically based on FIG. 13. FIG. 13 is a block diagram for sequentially explaining an example of data and commands transmitted and received between the client computer 34, the printer 36, and the content server 44 when the printer 36 prints the image data, and corresponds to FIG. 4 in the aforesaid first embodiment.

In FIG. 13, processing up to (4) is the same processing as that in the first embodiment. More specifically, the user accesses the content database 46 from the client computer 34 via the Internet 20. The user specifies image data which he or she wishes to print out of plural kinds of image data collected in the content database 46. The image data is read from the content database 46 by the reader 45a. Subsequently, the user (1) transmits a request for print of the image data and information that the printer 36 is designated as a printer to execute print to the content server 44 via the Internet 20.

In the content server 44 which has received the image data print request and the designation of the printer to execute print, (2) the printer specifying information requester 45b requests the printer specifying information PI to specify the printer from the printer 36 designated as the printer to execute print.

The printer 36 which has received the request for the printer specifying information PI, in the encrypting processing portion 50, (3) generates the printer specifying information PI by encrypting a printer identifier. Subsequently, the encrypting processing portion 50 of the printer 36 (4) transmits the generated printer specifying information PI to the content server 44 via the Internet 20.

Processing in and after (5) is different from that in the aforesaid first embodiment. More specifically, the content server 44 which has received the printer specifying information PI, in the print job data processing portion 45c, (5) generates the copy guard code CGCO3 (See FIG. 12) using this printer specifying information PI, and encrypts the whole content data CD which is the image data. Then, (6) the copy guard code CGCO3 is inserted at the head of the encrypted content data CD to generate print job data (See FIG. 11). Subsequently, the print job data processing portion 45c of the content server 44 (7) transmits the generated print job data to the printer 36 via the Internet 20.

The printer 36 which has received the print job data, in the decrypting processing portion 52, (8) extracts the copy guard code CGCO3 from the head of the print job data. The printer 36 then (9) reads the printer specifying information PI from the copy guard code CGCO3 and confirms whether this print job data is print job data generated for the printer 36 or not. Specifically, in the decrypting processing portion 52, whether or not the received printer specifying information PI can be decrypted by a printer decrypting key composed of an ID of the printer's own and information assigned to the printer 36 arbitrarily by the operator is confirmed, and when it can be decrypted, whether or not a printer identifier obtained by decrypting is that of the printer 36 itself is confirmed. When the decrypted printer identifier is that of the printer 36 itself, (10) the printer 36 requests a content data decrypting key from the content server 44 via the Internet 20. On the other hand, when the decrypted printer identifier is not that of the printer 36 itself or when the printer specifying information can not be decrypted, the printer 36 ends this print processing without requesting the content data decrypting key. Hence, even if the printer 36 receives print job data for other printers, it can not print this print job data.

The request for the content data decrypting key transmitted from the printer 36 is received by the decrypting key processing portion 45d of the content server 44. The decrypting key processing portion 45d then (11) transmits the content data decrypting key to the printer 36 via the Internet 20. The printer 36 which has received this content data decrypting key decrypts the encrypted content data CD with the content data decrypting key in the decrypting processing portion 52. Then, it transmits the decrypted content data CD to the print portion 54. Thereby, (12) print is normally executed in the print portion 54.

The print processing in the print system 10 according to this embodiment is schematically explained above, and now individual processing in the content server 44 and the printer 36 will be explained in detail.

Figure 14:
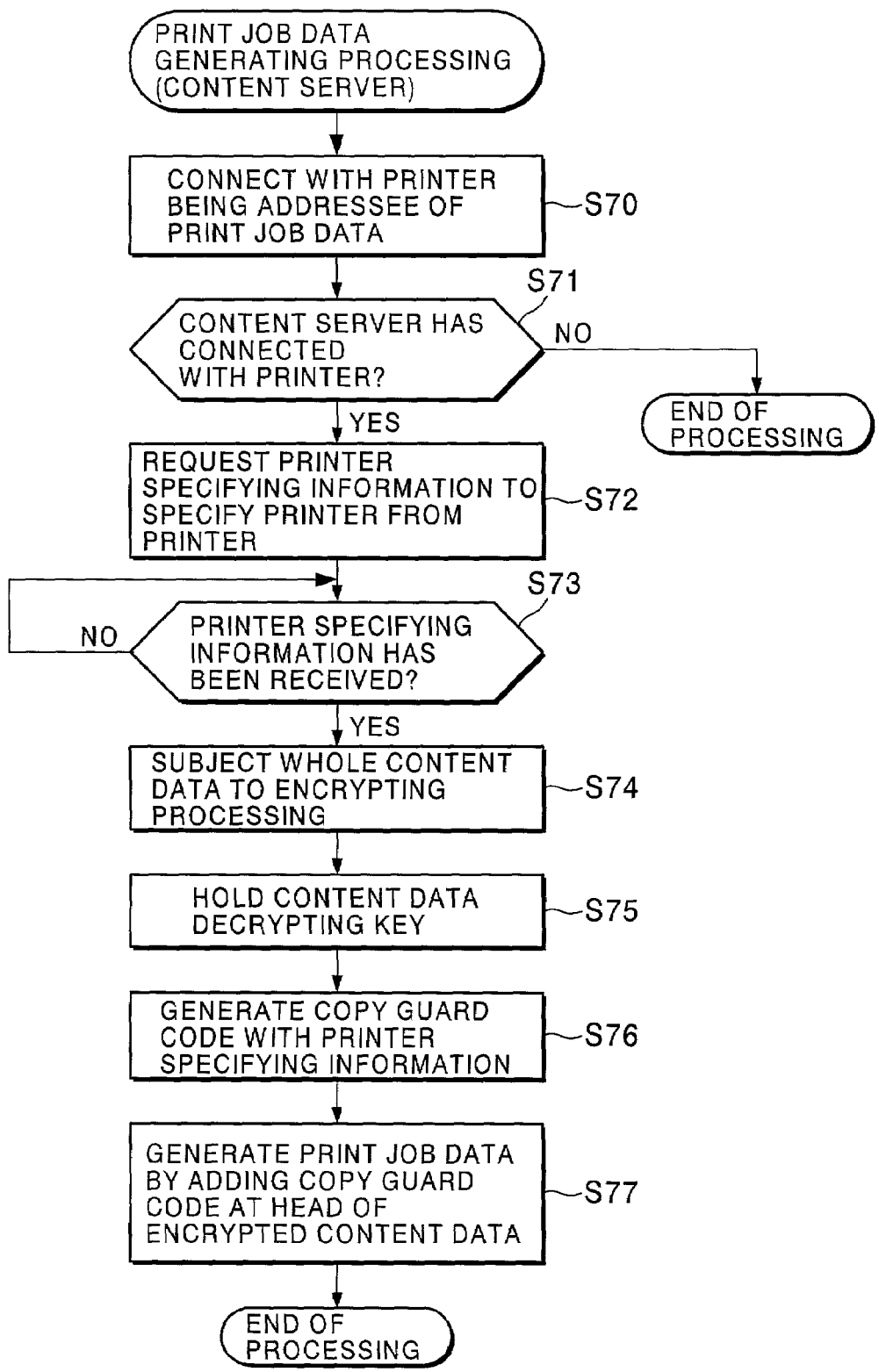
FIG. 14 is a flowchart explaining print job data generating processing executed in a content server according to the second embodiment of the present invention.

First, based on FIG. 14, print job data generating processing in the content server 44 will be explained. FIG. 14 is a flowchart explaining the print job data generating processing executed by the content server 44 which has received the image data print request and designation of the printer to execute print from the client computer 34.

In FIG. 14, processing from step S70 to step S73 is the same as processing from step S10 to step S13 in FIG. 5 in the aforesaid first embodiment. Namely, the content server 44 is connected to the printer 36 which is an addressee of the print job data via the Internet 20 (step S70).

Then the content server 44 judges whether it can be connected to the printer 36 to execute print or not (step S71). When the content server 44 can not be connected to the printer 36 to execute print (step S71: No), it ends this print job data generating processing.

Meanwhile, when being connected to the printer 36 to execute print (step S71: Yes), the content server 44 requests the printer specifying information PI to specify the printer from the printer 36 (step S72). The connection between the content server 44 and the printer 36 via the Internet 20 is maintained until this successive print processing is completed.

Subsequently, the content server 44 judges whether it has received the printer specifying information PI from the printer 36 or not (step S73), and when having not received it (step S73: No), the content server 44 stands by while repeating the processing in step S73.

Processing in and after step S74 is different from that in the aforesaid first embodiment. Namely, when having received the printer specifying information PI from the printer 36 via the Internet 20 (step S73: Yes), the content server 44 reads the content data selected by the user from the content database 46 and subjects the whole content data to encrypting processing (step S74). On the occasion of this encrypting processing, the content server 44 holds the content data decrypting key to decrypt this data (step S75).

Thereafter, the content server 44 generates the copy guard code CGCO3 by adding the printer specifying information PI received from the printer 36 to the copy guard command CGCM3 (step S76). Then, the content server 44 generates print job data by adding the copy guard code CGCO3 at the head of the content data CD encrypted in step S74 (step S77). Thus, the print job data generating processing according to this embodiment is completed.

Incidentally, printer specifying information providing processing in this embodiment is the same as that in FIG. 7 in the aforesaid first embodiment. Therefore, the detailed explanation thereof is omitted here.

Figure 15:
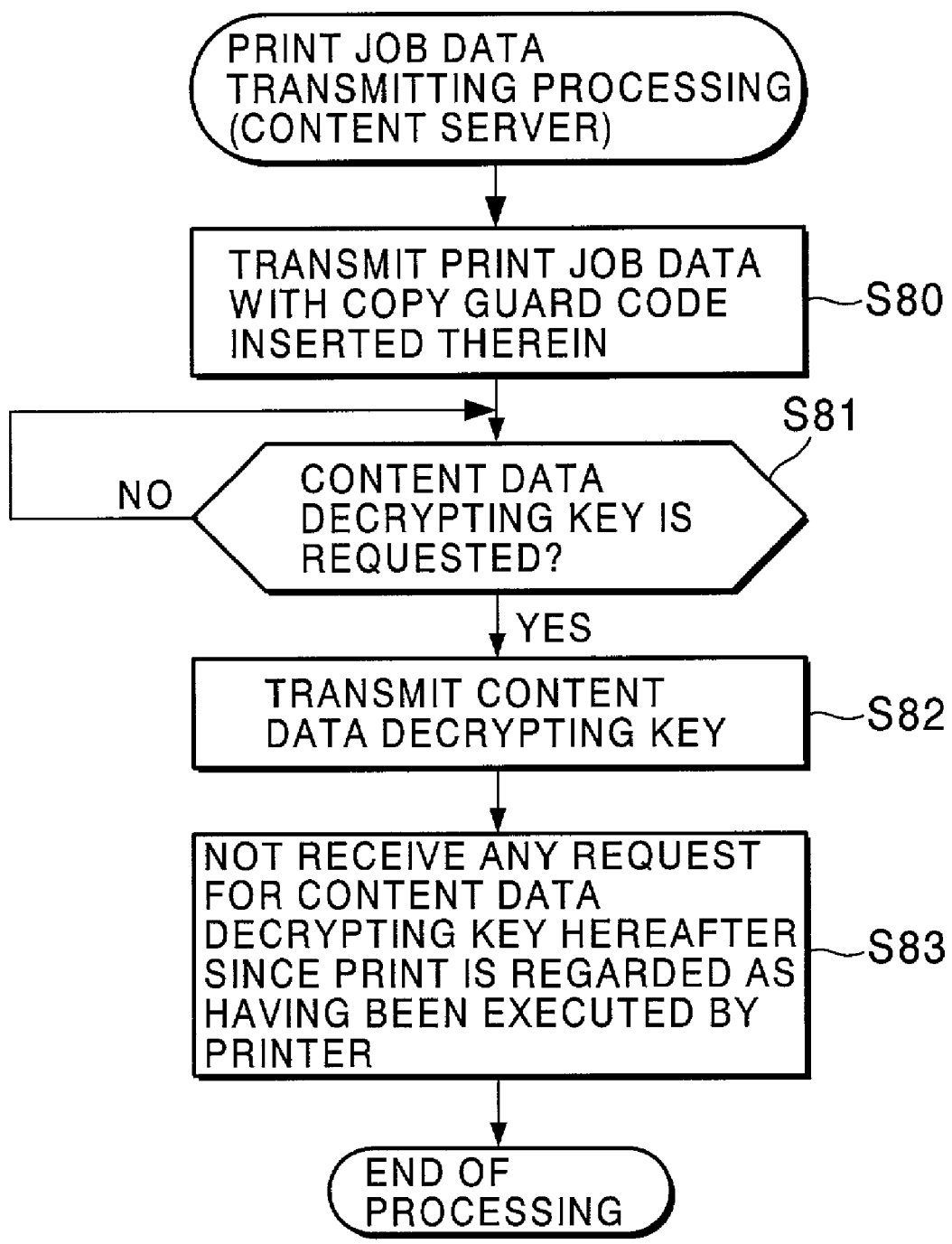
FIG. 15 is a flowchart explaining print job data transmitting processing executed in the content server according to the second embodiment of the present invention.

Next, print job data transmitting processing in the content server 44 will be explained based on FIG. 15. FIG. 15 is a flowchart explaining the print job data transmitting processing executed by the content server 44 which has completed the print job data generating processing shown in FIG. 14. Namely, this processing is executed by the content server 44 when the generation of the print job data is completed in step S77 in FIG. 14.

First, as shown in FIG. 15, the content server 44 transmits the print job data, in which one copy guard code CGCO3 is inserted at the head thereof, to the printer 36 via the Internet 20 (step S80). Subsequently, the content server 44 judges whether the transmission of the content data decrypting key is requested by the printer 36 or not (step S81). When the transmission of the content data decrypting key is not requested (step S81: No), the content server 44 stands by while repeating this processing in step S81.

When the transmission of the content data decrypting key is requested by the printer 36, the content server 44 transmits the content data decrypting key to the printer 36, including consent to print (step S82). Since the printer 36 is permitted to print this image data only once in this embodiment, when the content data decrypting key is transmitted in step S82, the content server 44 regards print by the printer 36 as having been executed by this transmission, and hence hereafter does not receive any transmission request even if any content data decrypting key transmitting request regarding this print job data is made by the printer 36. Accordingly, the printer 36 can print the received print job data only once.

Figure 16:
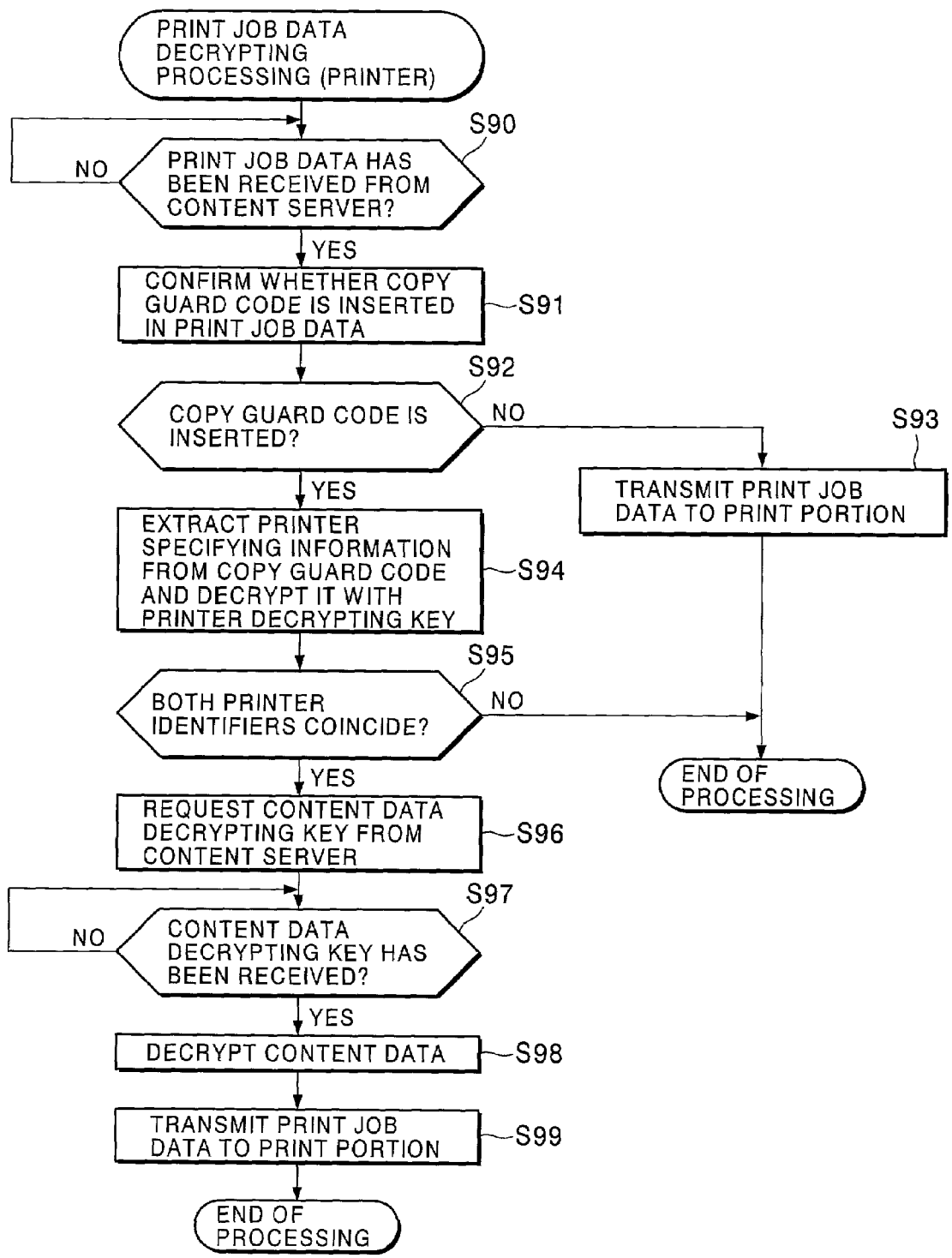
FIG. 16 is a flowchart explaining print job data decrypting processing executed in a printer according to the second embodiment of the present invention.

Next, print job data decrypting processing in the printer 36 will be explained based on FIG. 16. FIG. 16 is a flowchart explaining the print job data decrypting processing executed by the printer 36 which has completed the printer specifying information providing processing shown in FIG. 7 in the aforesaid first embodiment. Namely, also in this embodiment, the print job data decrypting processing is executed after the printer decrypting key is held in step S32 in FIG. 7.

First, as shown in FIG. 16, the printer 36 judges whether it has received the print job data from the content server 44 or not (step S90). When having not received the print job data (step S90: No), the printer 36 stands by while repeating this processing in step S90.

Meanwhile, when having received the print job data from the content server 44 (step S90: Yes), the printer 36 confirms whether the copy guard code CGCO3 is inserted in the print job data or not (step S91). Specifically, the printer 36 confirms whether the copy guard command CGCM3 exists at the head of the print job data or not. The case where the copy guard command CGCM3 exists shows that the copy guard code CGCO3 is inserted in this print job data.

When the copy guard code CGCO3 is not inserted (step S92: No), the print job data is ordinary print job data and hence transmitted as received to the print portion 54 (step S93). Thereby, ordinary print is executed.

On the other hand, when the copy guard code CGCO3 is inserted (step S92: Yes), the printer specifying information PI is extracted from the copy guard code CGCO3 at the head of the print job data and decrypted with the printer decrypting key held in step S32 (See FIG. 7) (step S94). More specifically, the printer specifying information PI is decrypted with the printer decrypting key composed of the printer's own ID and the information assigned to the printer 36 arbitrarily by the operator of the printer 36, and a printer identifier is obtained from the printer specifying information PI.

Thereafter, the printer 36 judges whether the printer identifier obtained by decrypting the printer specifying information PI coincides with its own printer identifier or not (step S95). When the printer identifier obtained by decrypting the printer specifying information PI does not coincide with its own printer identifier or when the printer specifying information can not be decrypted (step S95: No), this print job data is not generated for this printer 36, and hence the printer 36 ends this print job data decrypting processing.

When the printer identifier obtained by decrypting the printer specifying information PI coincides with its own printer identifier (step S95: Yes), the printer 36 requests the content data decrypting key from the content server 44 via the Internet 20 (step S96). The printer 36 then judges whether it has received the content data decrypting key from the content server 44 or not (step S97), and when having not received it (step S97: No), it stands by until reception while repeating this processing in step S97.

When having received the content data decrypting key from the content server 44 (step S97: Yes), the printer 36 decrypts the content data CD included in the print job data by using the content data decrypting key (step S98). Then, it transmits this decrypted content data CD as print job data to the print portion 54 (step S99) Thereby a normal print result of the image data can be obtained.

As stated above, according to the print system 10 related to this embodiment, when the printer 36 prints the print job data on the image data transmitted from the content server 44, only the printer 36 can print this data only once, whereby unjust copy print of image data collected in the content database 46 can be prevented.

Specifically, the printer specifying information PI including the printer identifier of the printer 36 is included in the print job data transmitted from the content server 44 to the printer 36. Only when printer identifiers coincide, the printer can print the print job data. Therefore, even if printers other than the printer 36 receive this print job data, they can not print this data.

Moreover, the printer specifying information PI can be decrypted only by the printer decrypting key being a combination of the ID peculiar to the printer 36 and information assigned arbitrarily by the operator of the printer 36, whereby even if printers other than the printer 36 acquire this print job data, they can not decrypt the printer specifying information PI.

Even in a printer without such a mechanism of preventing unjust copy print, the whole content data CD is encrypted, whereby unless the content data decrypting key is obtained from the content server 44, normal print can not be executed.

Moreover, the content data decrypting key which functions also as print permission is transmitted only once from the content server 44 to the printer 36, which can prevent a plurality of copies of image data from being printed unjustly by the printer 36. Besides, the printer 36 is designed to transmit a request for the content data decrypting key to the content server 44 only when the printer identifier included in the printer specifying information PI coincides with its own printer identifier. Accordingly, only when an addressee of the print job data generated by the content server 44 coincides with a printer which actually executes print, the content data decrypting key can be requested and obtained.

It should be noted that this embodiment is not limited to the above explanation but can be modified variously. For example, although the printer specifying information PI can be decrypted by the printer decrypting key composed of the printer's own ID and the information assigned to the printer 36 by the operator in the aforesaid embodiment, the printer specifying information PI may be encrypted and decrypted based on either one. However, when the printer specifying information PI can not be decrypted until two pieces of information, the printer's own ID and the information assigned to the printer 36 by the operator, coincide as in this embodiment, the difficulty of decrypting the printer specifying information PI is increased. Contrary to this, the printer identifier of the printer 36 may be transmitted as printer specifying information from the printer 36 to the content server 44 without being encrypted. This is because even if the printer specifying information PI is not generated by encrypting the printer identifier, the print job data can not be printed by printers other than the printer specified by the content server 44 unless the third person manipulates the print job data with dishonest intention.

[Third embodiment]

In a print system according to the third embodiment of the present invention, the printer 36 comprises an auxiliary memory in the aforesaid first embodiment. In this embodiment, a copyright on image data can be protected appropriately even in the case of the printer 36 having the auxiliary memory by removing copy guard codes of the print job after the printer reads the print job from the auxiliary memory instead of removing the copy guard codes at a stage at which this print job is downloaded to the auxiliary memory provided in the printer. This will be explained in detail below.

Figure 17:
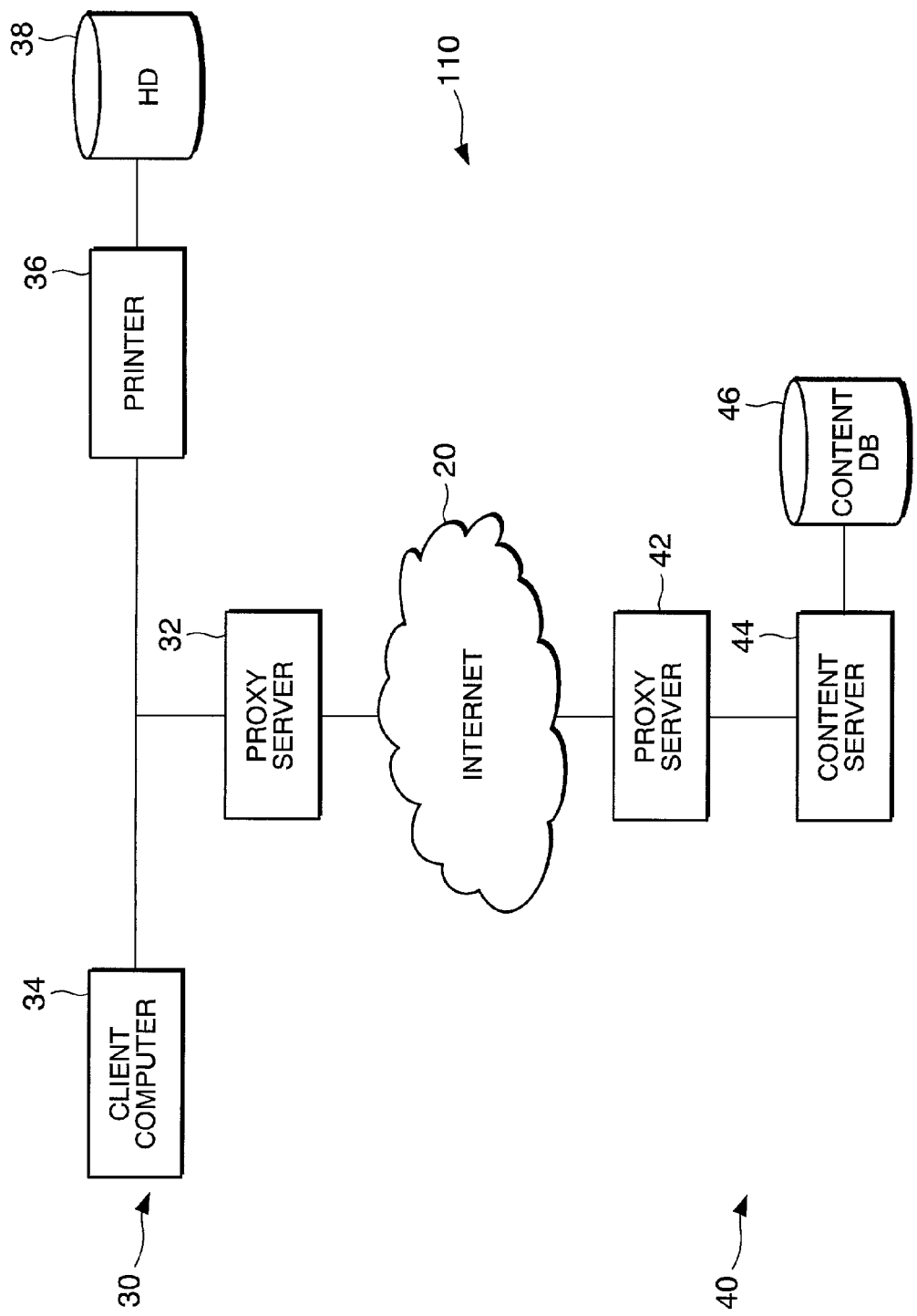
FIG. 17 is a diagram showing an example of a hardware configuration of a print system according to a third and a fourth embodiment of the present invention.

First of all, the configuration of the print system according to this embodiment will be explained based on FIG. 17. FIG. 17 is a schematic block diagram showing the configuration of the print system according to this embodiment and corresponds to FIG. 1 in the aforesaid first embodiment.

As shown in FIG. 17, a print system 110 according to this embodiment is different from that according to the aforesaid first embodiment in that the printer 36 comprises a hard disk 38. The hard disk 38 may be contained in the printer 36 or may be attached to the outside thereof. The hard disk 38 composes the auxiliary memory in this embodiment. The print system 110 has the same structure as that in the first embodiment except that the printer 36 comprises the hard disk 38.

Print job data transmitted from the client computer 34 are received by the printer 36 via the local area network 30 and temporarily stored in the hard disk 38. The printer 36 reads out the print job data stored in the hard disk 38 in sequence and executes print.

Various kinds of data received from the Internet 20 via the proxy server 32 are received by the client computer 34 or the printer 36. Especially, print job data received by the printer 36 from the Internet 20 via the proxy server 32 are temporarily stored in the hard disk 38. The printer 36 then reads out the print job data stored in the hard disk 38 in sequence and executes print.

Incidentally, in some cases, the printer 36 prints print job data without temporarily storing the print job data in the hard disk 38 depending on the setting of the printer 36 and the setting of the print job data.

The structure of print job data according to this embodiment is the same as that in the aforesaid first embodiment (See FIG. 2), and the data structures of the copy guard codes CGCO1 and CGCO2 are also the same as those in the first embodiment (See FIG. 3A and FIG. 3B).

Figure 18:
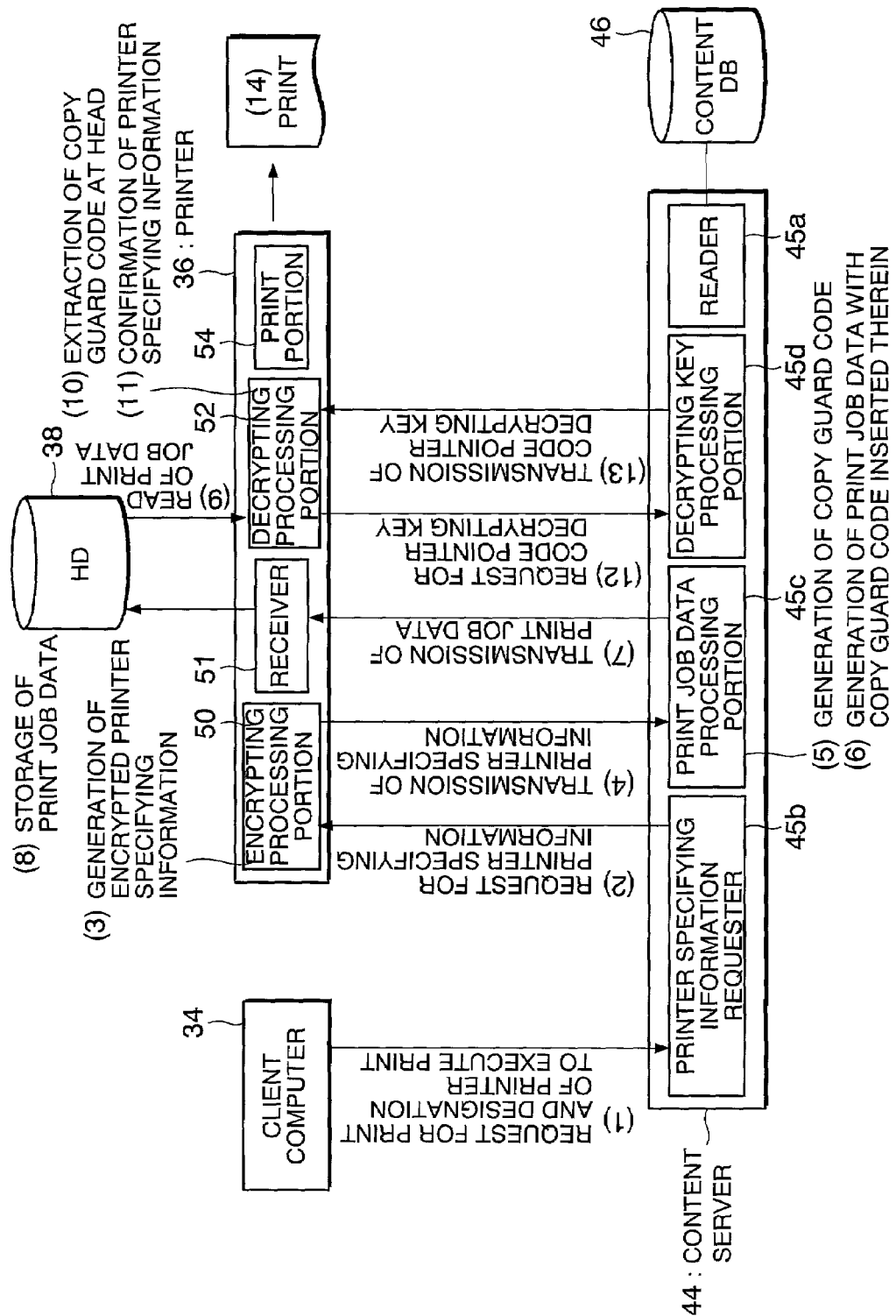
FIG. 18 is a block diagram schematically explaining the whole print processing in the print system according to the third embodiment of the present invention.

Next, based on FIG. 18, print processing of image data in the print system 110 according to this embodiment will be explained schematically. FIG. 18 is a block diagram for sequentially explaining an example of data and commands transmitted and received between the client computer 34, the printer 36, and the content server 44 when the printer 36 prints the image data.

As shown in FIG. 18, the user accesses the content database 46 from the client computer 34 via the Internet 20. The user specifies image data which he or she wishes to print out of plural kinds of image data collected in the content database 46. The image data is read from the content database 46 by the reader 45a. Subsequently, the user (1) transmits a request for print of the image data and information that the printer 36 is designated as a printer to execute print to the content server 44 via the Internet 20.

In the content server 44 which has received the image data print request and the designation of the printer to execute print, (2) the printer specifying information requester 45b requests the printer specifying information PI to specify the printer from the printer 36 designated as the printer to execute print.

The printer 36 which has received the request for the printer specifying information PI (3) generates the encrypted printer specifying information PI in the encrypting processing portion 50. In this embodiment, the printer 36 generates the printer specifying information PI by encrypting a printer identifier to distinguish the printer 36 from other printers by means of an ID of the printer's own and information assigned to the printer 36 arbitrarily by the operator of the printer 36. Therefore, these printer's own ID and information assigned to the printer 36 by the operator compose a printer decrypting key to decrypt the printer specifying information PI. Moreover, in this embodiment, a MAC (Media Access Control) address is used as the printer identifier to distinguish the printer 36 from other printers. The MAC address is a peculiar address assigned to a LAN card connected to Ethernet at the time of fabrication. Subsequently, the encrypting processing portion 50 of the printer 36 (4) transmits the generated printer specifying information PI to the content server 44 via the Internet 20.

The content server 44 which has received the printer specifying information PI, in the print job data processing portion 45c, (5) generates the copy guard code CGCO1 (See FIG. 3A) using the printer specifying information PI, and generates the copy guard codes CGCO2 (See FIG. 3B) subsequent to the copy guard code CGCO1. Then, (6) the copy guard codes CGCO1 and CGCO2 are inserted properly in the content data CD to generate print job data (See FIG. 2). The positions where the copy guard codes CGCO2 are inserted in the content data CD are determined randomly by random numbers every time print job data is generated. The print job data processing portion 45c of the content server 44 (7) transmits the generated print job data to the printer 36 via the Internet 20.

The transmitted print job data (8) is received by a receiver 51 of the printer 36 and temporarily stored in the hard disk 38. Then (9) the print job data is read from the hard disk 38 by the decrypting processing portion 52 in timing immediately before execution of print. In the decrypting processing portion 52, (10) the copy guard code CGCO1 is extracted from the head of the read print job data. Subsequently, (11) the printer specifying information PI is read from the copy guard code CGCO1, and whether this print job data is print job data generated for the printer 36 is confirmed. Specifically, in the decrypting processing portion 52, whether or not the received printer specifying information PI can be decrypted by the printer decrypting key composed of the printer's own ID and the information assigned to the printer 36 by the operator is confirmed, and when it can be decrypted, whether or not a printer identifier obtained by decrypting is that of the printer 36 itself is confirmed. When the printer identifier obtained by decrypting is that of the printer 36 itself, (12) the printer 36 requests a code pointer decrypting key from the content server 44 via the Internet 20. On the other hand, when the decrypted printer identifier is not that of the printer 36 itself or when the printer specifying information can not be decrypted, the printer 36 ends this print processing without requesting the code pointer decrypting key. Hence, even if the printer 36 receives print job data for other printers, it can not print this print job data.

The request for the code pointer decrypting key transmitted from the printer 36 is received by the decrypting key processing portion 45d of the content server 44. The decrypting key processing portion 45d then (13) transmits the code pointer decrypting key to the printer 36 via the Internet 20. The printer 36 which has received this code pointer decrypting key extracts the code pointer CP1 included in the copy guard code CGCO1 and decrypts it with the code pointer decrypting key in the decrypting processing portion 52. As a result of this decrypting, the position of the second copy guard code CGCO2 is obtained. Then, after the copy guard code CGCO1 is extracted from the print job data, the print job data is transmitted to the print portion 54. Also, the print job data is transmitted to the print portion 54 after the second and subsequent copy guard codes CGCO2 are extracted in sequence each based on position information indicated by the code pointer CP2 included in the preceding copy guard code CGCO2. Thereby, (14) print is normally executed in the print portion 54.

The print processing in the print system 110 according to this embodiment is schematically explained above, and now individual processing in the content server 44 and the printer 36 will be explained in detail. However, print job data generating processing (FIG. 5 and FIG. 6), printer specifying information providing processing (FIG. 7), and print job data transmitting processing (FIG. 8) in this embodiment are the same as those in the aforesaid first embodiment, and hence the detailed explanation thereof is omitted.

Figure 19:
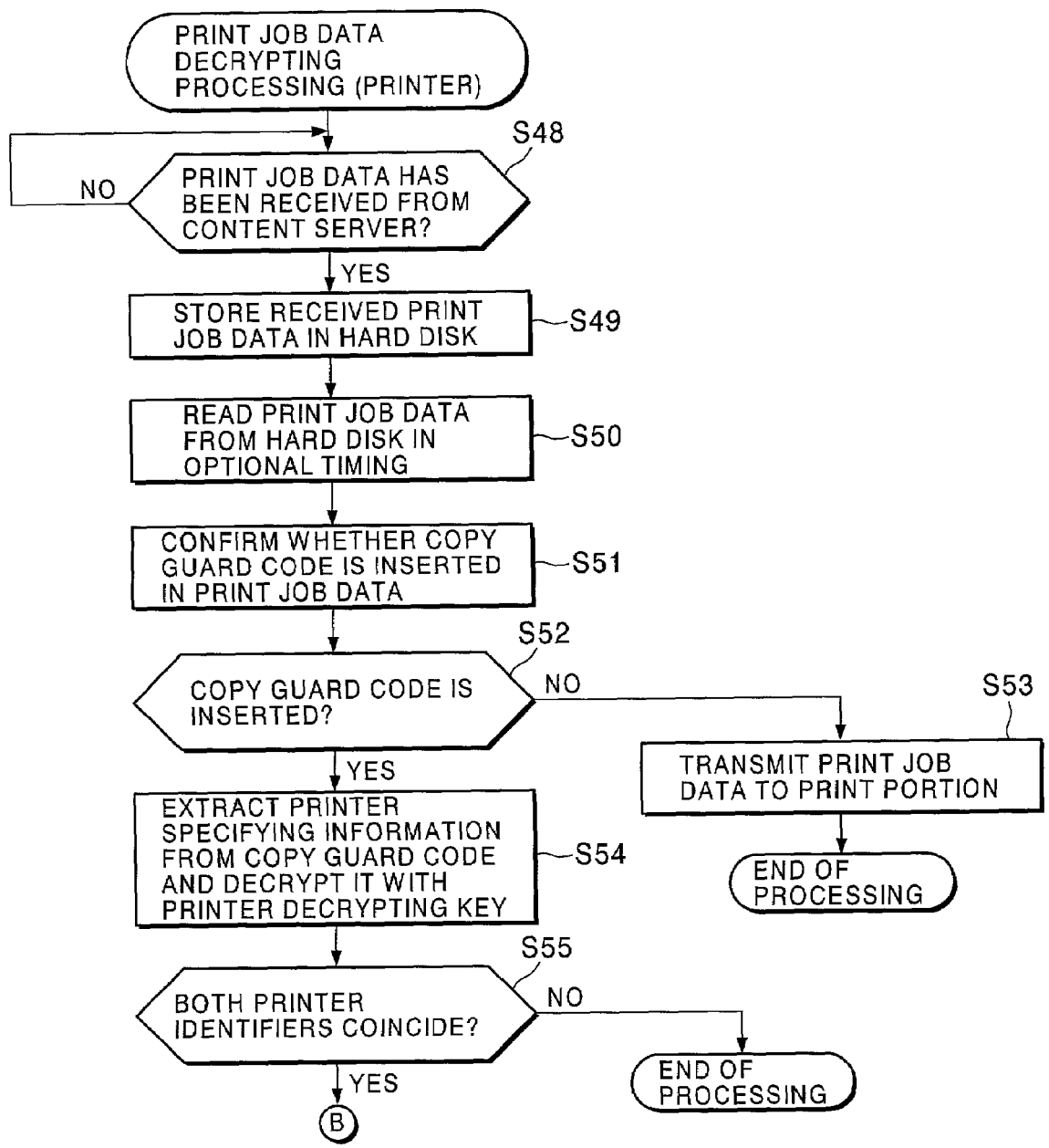
FIG. 19 is a flowchart explaining print job data decrypting processing executed in a printer according to the third embodiment of the present invention (a first flowchart)
Figure 20:
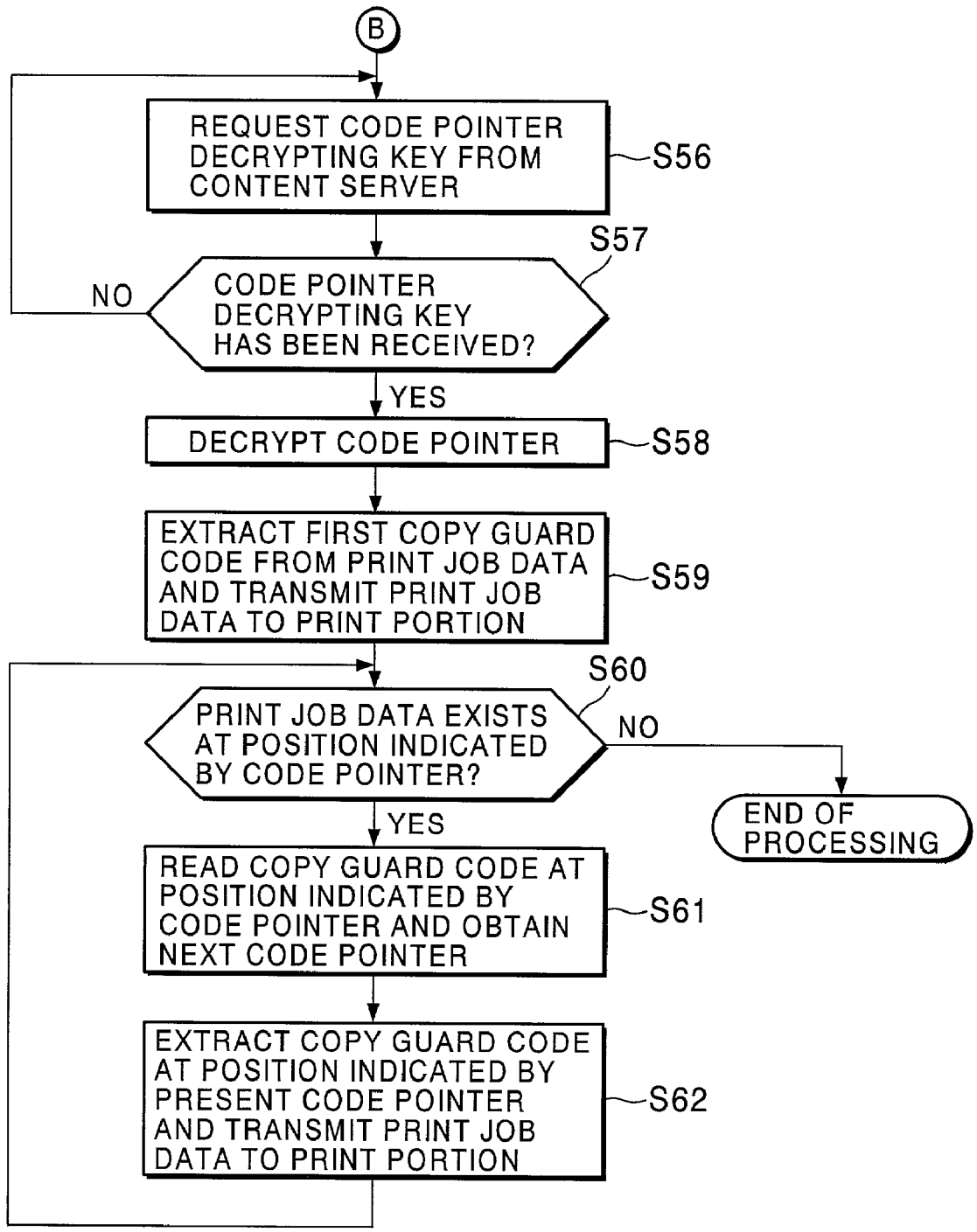
FIG. 20 is a flowchart explaining the print job data decrypting processing executed in the printer according to the third embodiment of the present invention (a second flowchart)

Next, print job data decrypting processing in the printer 36 will be explained based on FIG. 19 and FIG. 20. FIG. 19 and FIG. 20 are flowcharts explaining the print job data decrypting processing executed by the printer 36 which has completed the printer specifying information providing processing shown in FIG. 7. Namely, the processing is executed by the printer 36 after the printer holds the printer decrypting key in step S32 in FIG. 7.

First, as shown in FIG. 19, the printer 36 judges whether it has received print job data from the content server 44 or not (step S48). When having not received the print job data (step S48: No), the printer 36 stands by while repeating the processing in step S48.

Meanwhile, when having received the print job data from the content server 44 (step S48: Yes), the printer 36 temporarily stores this received print job data in the hard disk 38 (step S49). The printer 36 then reads the print job data stored in the hard disk 38 in optional timing (step S50). The optional timing means, for example, a point in time when a printer engine has completed print of the preceding print job data and starts print of the next print job data.

Thereafter, the printer 36 confirms whether the copy guard code CGCO1 is inserted in the print job data or not (step S51). Specifically, the printer 36 confirms whether the copy guard command CGCM1 exists at the head of the print job data or not. The case where the copy guard command CGCM1 exists shows that the copy guard codes CGCO1 and CGCO2 are inserted in this print job data.

When the copy guard code CGCO1 is not inserted (step S52: No), the print job data is ordinary print job data and hence transmitted as received to the print portion 54 (step S53). Thereby, ordinary print is executed.

On the other hand, when the copy guard code CGCO1 is inserted (step S52: Yes), the printer specifying information PI is extracted from the copy guard code CGCO1 at the head of the print job data and decrypted with the printer decrypting key held in step S32 (See FIG. 7) (step S54). Namely, the printer specifying information PI is decrypted with the printer decrypting key composed of the printer's own ID and the information assigned to the printer 36 arbitrarily by the operator of the printer 36, and a printer identifier is obtained from the printer specifying information PI.

The printer 36 then judges whether the printer identifier obtained by decrypting the printer specifying information PI coincides with its own printer identifier or not (step S55). When the printer identifier obtained by decrypting the printer specifying information PI does not coincide with its own printer identifier or when the printer specifying information can not be decrypted (step S55: No), this print job data is not generated for the printer 36, and hence the printer 36 ends this print job data decrypting processing.

Meanwhile, when the printer identifier obtained by decrypting the printer specifying information PI coincides with its own printer identifier (step S55: Yes), as shown in FIG. 20, the printer 36 requests a code pointer decrypting key from the content server 44 via the Internet 20 (step S56). The printer 36 judges whether it has received the code pointer decrypting key from the content server 44 or not (step S57), and when having not received it (step S57: No), it stands by until reception while repeating the processing in step S57.

When having received the code pointer decrypting key from the content server 44 (step S57: Yes), the printer 36 decrypts the code pointer CP1 of the copy guard code CGCO1 at the head of the print job data using the code pointer decrypting key (step S58). Thereby, the position of the second copy guard code CGCO2 is known.

The printer 36 then removes the copy guard code CGCO1 from the head of the print job data and transmits the print job data up to but excluding the position of the second copy guard code CGCO2 (the position indicated by the code pointer CP1) to the print portion 54 (step S59). The printer 36 then judges whether the print job data exists at the position indicated by the code pointer CP1 decrypted in step S58 or not (step S60). When the print job data does not exist at this position (step S60: No), all the copy guard codes CGCO1 and CGCO2 are removed from the print job data received from the content server 44, and hence the printer 36 ends this print job data decrypting processing.

When the print job data exists at the position indicated by the code pointer CP1 (step S60: Yes), the printer 36 reads out the copy guard code CGCO2 at the position indicated by the code pointer CP1 and obtains its code pointer CP2 (step S61).

Subsequently, the printer 36 removes the copy guard code CGCO2 read in step S61 and transmits the print job data up to but excluding the position indicated by its code pointer CP2 to the print portion 54 (step S62). Then, it returns to step S60.

After this, the aforesaid processing from step S60 to step S62 is repeated. In the second and subsequent loops, however, in step S60, whether or not the print job data exists at a position indicated by the code pointer CP2 obtained in the last step S61 is judged. In step S61, a code pointer CP2 of the next copy guard code CGCO2 is obtained at a position indicated by the code pointer CP2 obtained in the last step S61. Subsequently, in step S62, the copy guard code CGCO2 is removed at the position indicated by the code pointer CP2 obtained in the step S61 before last and then the print job data is transmitted to the print portion 54 (step S62).

As stated above, according to the print system 110 related to this embodiment, instead of removing the copy guard codes CGCO1 and CGCO2 at the stage at which the print job data is stored in the hard disk 38 provided in the printer 36, the copy guard codes CGCO1 and CGCO2 are removed after the printer 36 reads the print job data from the hard disk 38 immediately before executing print. Hence, even if any user with dishonest intention reads the print job data from the hard disk 38 by dishonest means, normal print of this print job data can not be executed. Moreover, since the code pointer decrypting key is transmitted from the content server 44 only once, it is impossible to repeatedly read the print job data from the hard disk 38 and print it.

Incidentally, it is needless to say that this embodiment is not limited to the above explanation but can be modified variously likewise with the aforesaid first embodiment.

[Fourth embodiment]

In the fourth embodiment of the present invention, even in the case of a printer comprising an auxiliary memory, a copyright on image data can be protected appropriately by combining the aforesaid second embodiment with the aforesaid third embodiment. This will be explained below in detail.

The configuration of the print system 110 according to this embodiment is the same as that in FIG. 17 in the third embodiment, and hence the detailed explanation thereof is omitted. Meanwhile, the structure of print job data and the structure of the copy guard code CGCO3 are the same as those in the second embodiment, whereby the detailed explanation thereof is omitted.

Figure 21:
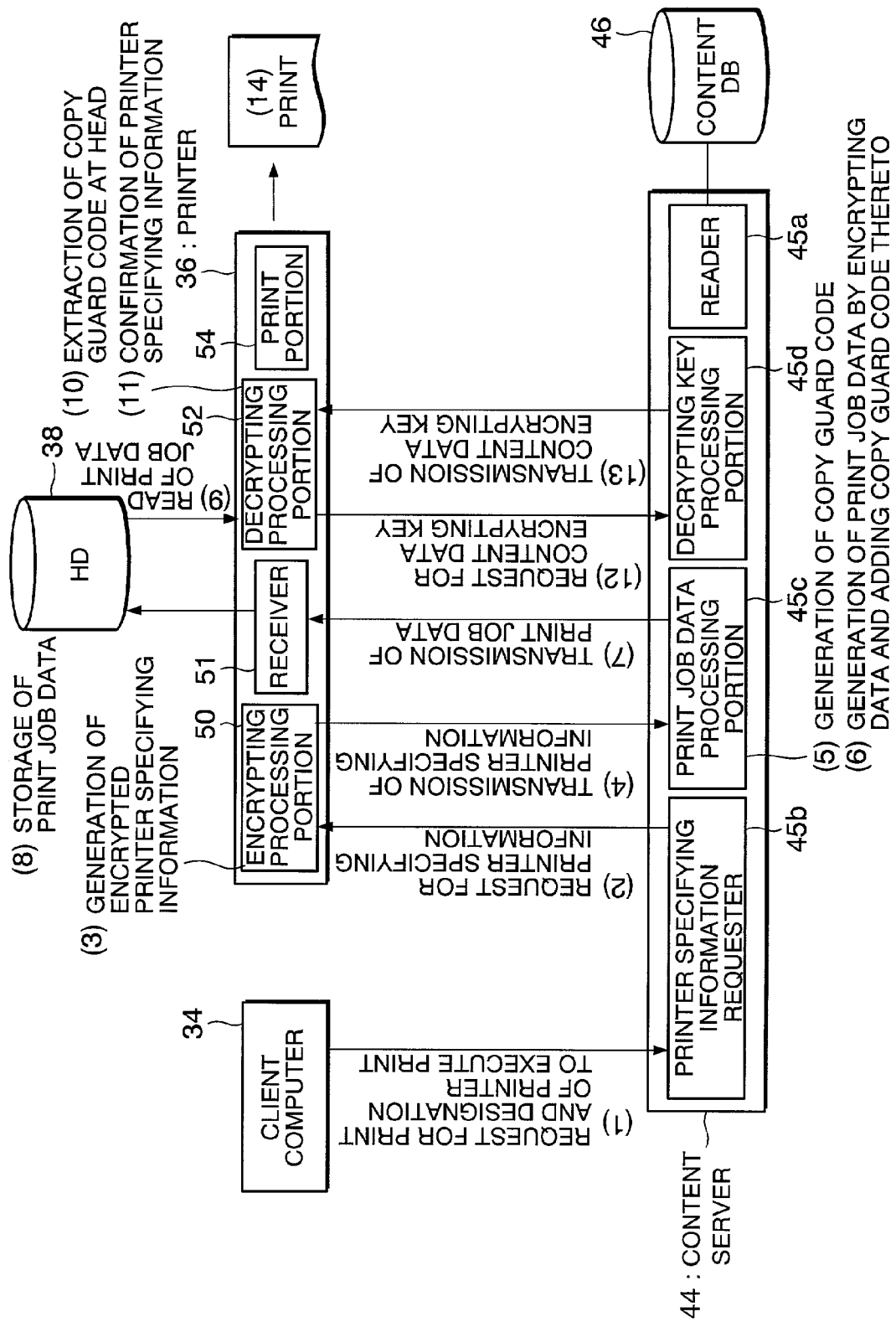
FIG. 21 is a block diagram schematically explaining the whole print processing in the print system according to the fourth embodiment of the present invention.

First of all, based on FIG. 21, print processing of image data in the print system 110 according to this embodiment will be explained schematically. FIG. 21 is a block diagram for sequentially explaining an example of data and commands transmitted and received between the client computer 34, the printer 36, and the content server 44 when the printer 36 prints the image data, and corresponds to FIG. 18 in the third embodiment.

In FIG. 21, processing up to (4) is the same as that in the third embodiment. More specifically, the user accesses the content database 46 from the client computer 34 via the Internet 20. The user specifies image data which he or she wishes to print out of plural kinds of image data collected in the content database 46. The image data is read from the content database 46 by the reader 45a. Subsequently, the user (1) transmits a request for print of the image data and information that the printer 36 is designated as a printer to execute print to the content server 44 via the Internet 20.

In the content server 44 which has received the image data print request and the designation of the printer to execute print, (2) the printer specifying information requester 45b requests the printer specifying information PI to specify the printer from the printer 36 designated as the printer to execute print.

The printer 36 which has received the request for the printer specifying information PI (3) generates the printer specifying information PI by encrypting its printer identifier in the encrypting processing portion 50. Subsequently, the encrypting processing portion 50 of the printer 36 (4) transmits the generated printer specifying information PI to the content server 44 via the Internet 20.

The following processing in and after (5) is different from that in the third embodiment. More specifically, the content server 44 which has received the printer specifying information PI, in the print job data processing portion 45c, (5) generates the copy guard code CGCO3 (See FIG. 12) using the printer specifying information PI, and encrypts the whole content data CD which is image data. Then, (6) the copy guard code CGCO3 is inserted at the head of the encrypted content data CD to generate print job data (See FIG. 11). The print job data processing portion 45c of the content server 44 (7) transmits the generated print job data to the printer 36 via the Internet 20.

The transmitted print job data (8) is received by the receiver 51 of the printer 36 and temporarily stored in the hard disk 38. Then (9) the print job data is read from the hard disk 38 by the decrypting processing portion 52 in timing immediately before execution of print. In the decrypting processing portion 52, (10) the copy guard code CGCO3 is extracted from the head of the read print job data. Subsequently, (11) the printer specifying information PI is read from this copy guard code CGCO3, and whether this print job data is print job data generated for the printer 36 is confirmed. Specifically, in the decrypting processing portion 52, whether or not the received printer specifying information PI can be decrypted by a printer decrypting key composed of an ID of the printer's own and information assigned to the printer 36 arbitrarily by the operator is confirmed, and when it can be decrypted, whether or not a printer identifier obtained by decrypting is that of the printer 36 itself is confirmed. When the printer identifier obtained by decrypting is that of the printer 36 itself, (12) the printer 36 requests a content data decrypting key from the content server 44 via the Internet 20. On the other hand, when the decrypted printer identifier is not that of the printer 36 itself or when the printer specifying information can not be decrypted, the printer 36 ends this print processing without requesting the content data decrypting key. Hence, even if the printer 36 receives print job data for other printers, it can not print this print job data.

The request for the content data decrypting key transmitted from the printer 36 is received by the decrypting key processing portion 45d of the content server 44. The decrypting key processing portion 45d then (13) transmits the content data decrypting key to the printer 36 via the Internet 20. The printer 36 which has received this content data decrypting key decrypts the encrypted content data CD with the content data decrypting key in the decrypting processing portion 52. Then, it transmits the decrypted content data CD to the print portion 54. Thus, (14) print is normally executed in the print portion 54.

The print processing in the print system 110 according to this embodiment is schematically explained above, and now individual processing in the content server 44 and the printer 36 will be explained in detail. However, print job data generating processing (FIG. 14) and print job data transmitting processing (FIG. 15) in this embodiment are the same as those in the aforesaid second embodiment, and hence the detailed explanation thereof is omitted.

Figure 22:
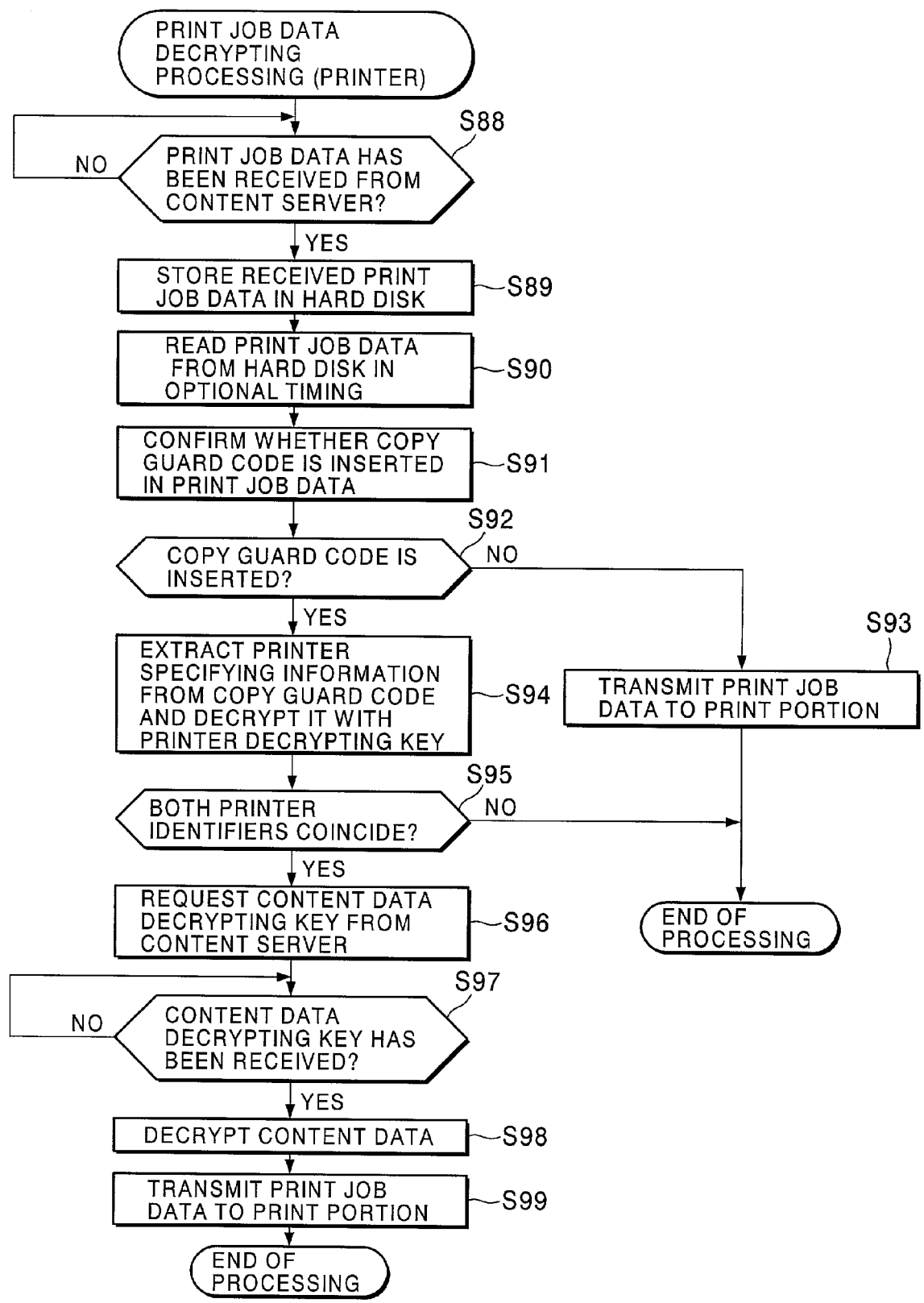
FIG. 22 is a flowchart explaining print job data decrypting processing executed in a printer according to the fourth embodiment of the present invention.

Print job data decrypting processing in the printer 36 will be explained based on FIG. 22. FIG. 22 is a flowchart explaining the print job data decrypting processing executed by the printer 36 which has completed the printer specifying information providing processing in FIG. 7. Namely, also in this embodiment, the print job data decrypting processing is executed after the printer decrypting key is held in step S32 in FIG. 7.

First, as shown in FIG. 22, the printer 36 judges whether it has received print job data from the content server 44 or not (step S88). When having not received the print job data (step S88: No), the printer 36 stands by while repeating the processing in step S88.

Meanwhile, when having received the print job data from the content server 44 (step S88: Yes), the printer 36 temporarily stores this received print job data in the hard disk 38 (step S89). The printer 36 then reads the print job data stored in the hard disk 38 in optional timing (step S90). The optional timing means, for example, a point in time when the printer engine has completed print of the preceding print job data and starts print of the next print job data.

Thereafter, the printer 36 confirms whether the copy guard code CGCO3 is inserted in the print job data or not (step S91). Specifically, the printer 36 confirms whether the copy guard command CGCM3 exists at the head of the print job data or not. The case where the copy guard command CGCM3 exists shows that the copy guard code CGCO3 is inserted in this print job data.

When the copy guard code CGCO3 is not inserted (step S92: No), the print job data is ordinary print job data and hence transmitted as received to the print portion 54 (step S93). Thereby, ordinary print is executed.

On the other hand, when the copy guard code CGCO3 is inserted (step S92: Yes), the printer specifying information PI is extracted from the copy guard code CGCO3 at the head of the print job data and decrypted with the printer decrypting key held in step S32 (See FIG. 7) (step S94). Namely, the printer specifying information PI is decrypted with the printer decrypting key composed of the printer's own ID and the information assigned to the printer 36 arbitrarily by the operator of the printer 36, and a printer identifier is obtained from the printer specifying information PI.

The printer 36 then judges whether the printer identifier obtained by decrypting the printer specifying information PI coincides with its own printer identifier or not (step S95). When the printer identifier obtained by decrypting the printer specifying information PI does not coincide with its own printer identifier or when the printer specifying information can not be decrypted (step S95: No), this print job data is not generated for the printer 36, and hence the printer 36 ends this print job data decrypting processing.

When the printer identifier obtained by decrypting the printer specifying information PI coincides with its own printer identifier (step S95: Yes), the printer 36 requests the content data decrypting key from the content server 44 via the Internet 20 (step S96). The printer 36 judges whether it has received the content data decrypting key from the content server 44 or not (step S97), and when having not received it (step S97: No), it stands by until reception while repeating the processing in step S97.

When having received the content data decrypting key from the content server 44 (step S97: Yes), the printer 36 decrypts the content data CD included in the print job data by using the content data decrypting key (step S98). Then, it transmits this decrypted content data CD as the print job data to the print portion 54 (step S99). Thereby, a normal print result of the image data can be obtained.

As stated above, according to the print system 110 related to this embodiment, at the stage at which print job data is stored in the hard disk 38 provided in the printer 36, the print job data is stored without the copy guard code CGCO3 being removed therefrom and the content data CD being decrypted. After the print job data is read from the hard disk 38 immediately before the printer 36 executes print, the copy guard code CGCO3 is removed therefrom, and the content data CD is decrypted. Therefore, even if any user with dishonest intention reads the print job data from the hard disk 38 by dishonest means, this print job data can not be normally printed. Moreover, since the content data decrypting key is transmitted from the content server 44 only once, it is impossible to repeatedly read the print job data from the hard disk 38 and print it.

Incidentally, it is needless to say that this embodiment is not limited to the above explanation but can be modified variously likewise with the aforesaid second embodiment.

Besides, the present invention is not limited to the aforesaid first to fourth embodiments but can be modified variously. For example, although the content data CD can be printed only once by the right printer 36 in the first to fourth embodiments, a plurality of, for example, two or three pieces of paper can be printed. This can be realized, for example, by transmitting the code pointer decrypting key or the content data decrypting key a plurality of times from the content server 44 to the printer 36. If so, the printer 36 can print the content data CD the same number of times as that of the reception of the code pointer decrypting key or the content data decrypting key. Moreover, when the code pointer decrypting key or the content data decrypting key is transmitted from the content server 44 to the printer 36, information on the printable number of pieces of paper may be included therein.

In the aforesaid first to fourth embodiments, the content server 44 holds the code pointer decrypting key and the content data decrypting key and transmits these code pointer decrypting key and content data decrypting key to the printer 36 based on the request from the printer 36, but these code pointer decrypting key and content data decrypting key need not always be held by the content server 44. For example, it is recommended that an agreement on these code pointer decrypting key and content data decrypting key be concluded in advance between the content server 44 and the printer 36 and that the printer 36 can decrypt the print job data even if the printer 36 obtains neither the code pointer decrypting key nor the content data decrypting key from the content server 44.

Further, a method of protection for preventing unjust copy of the content data CD is not limited to the aforesaid first to fourth embodiments, and protection may be provided by a different method. In this case, after reading the print job data from the hard disk 38, the printer 36 obtains the protection removing key, which removes its protection, from the content server 44.

Furthermore, in the aforesaid first to fourth embodiments, the case where the content data CD is static image data on photographs and the like and printed by the printer 36 is explained as an example, but the present invention is not limited to these conditions. For example, the content data CD may be dynamic image data, music data, sound data, or the like, and as a reproducer thereof, a television, a music/sound playback player, or the like is also suitable.

As for each processing explained in the aforesaid first to fourth embodiments, it is possible to record a program to execute each processing on a record medium such as a floppy disk, a CD-ROM (Compact Disc-Read Only Memory), a ROM, or a memory card and distribute this program in the form of the record medium. In this case, the aforesaid embodiments can be realized by making the client computer 34, the printer 36, and/or the content server 44 read the record medium on which this program is recorded and execute this program.

The client computer 34, the printer 36, and/or the content server 44 sometimes has other programs such as an operating system, other application programs, and the like. In this case, by using these other programs possessed by the client computer 34, the printer 36, and/or the content server 44, such a command as calls a program to realize processing equal to that in the aforesaid embodiments out of these programs possessed by the client computer 34, the printer 36, and/or the content server 44 may be recorded on the record medium.

Further, such a program can be distributed not in the form of the record medium but in the form of a carrier wave via a network (the Internet 20, for example). The program transmitted in the form of the carrier wave over the network is fetched and executed by the client computer 34, the printer 36, and/or the content server 44, whereby the aforesaid embodiments can be realized.

Furthermore, when being recorded on the record medium or transmitted as the carrier wave over the network, the program is sometimes encrypted or compressed. In this case, the client computer 34, the printer 36, and/or the content server 44 which has read the program from the record medium or the carrier wave needs to execute the program after decrypting or expanding it.

What is claimed is:

1. A print system, comprising:
    a content server;
    a plurality of printers connectable to the content server via a network; and
    a client computer connectable to the content server via the network;
    wherein the content server comprises:
    a content database which collects a plurality of kinds of content original data;
    a reader which reads content original data of a kind selected by a client as content data from the content database;
    a printer specifying information requester which transmits a request for transmission of printer specifying information from the content server to a printer which is selected by the client computer, wherein the printer specifying information includes a printer identifier to specify the printer;
    wherein the printer comprises:
    a printer specifying information transmitter which transmits the printer specifying information including the printer identifier from the printer to the content server based on the request from the printer specifying information requester;
    wherein the content server further comprises:
    a print job generator which generates print job data including at least the content data and the printer specifying information based on the content data read by the reader and the received printer specifying information; and
    a print job data transmitter which transmits the print job data from the content server to the printer;
    wherein the printer further comprises:
    a print job data receiver which receives the print job data transmitted from the content server;
    a judging portion which reads the printer identifier included in the printer specifying information of the print job data and judges whether the printer identifier coincides with its own printer identifier; and
    a print executor which executes print of the print job data in the printer only when the judging portion judges that the printer identifier included in the print job data coincides with its own printer identifier;
    wherein the print job data includes at least one first copy guard code inserted at a specific position and one or a plurality of second copy guard codes inserted dispersively in the content data as required depending on a data length of the content data,
    wherein the print job data generator generates the first copy guard code including at least the printer specifying information and a first code pointer indicating a position of a next second copy guard and inserts the first copy guard code at the specific position, and when the content data exists at a position indicated by the first code pointer, inserts a second copy guard code including at least a second code pointer which indicates a position of a second copy guard code next to the next second copy guard code at the position, and repeats the insertion of the second copy guard codes until the entire length of the content data is covered, and
    wherein the first and second code pointers are determined randomly every time these first and second code pointers are generated.

2. The print system according to claim 1, wherein when transmitting the printer specifying information to the content server, the printer encrypts the printer identifier and transmits the encrypted printer identifier as the printer specifying information.

3. The print system according to claim 1, wherein when transmitting the printer specifying information to the content server, the printer transmits the printer identifier as the printer specifying information without encrypting the printer identifier.

4. The print system according to claim 1, wherein the content server encrypts the first code pointer.

5. The print system according to claim 1, wherein the content server encrypts the first code pointer and holds a code pointer decrypting key which is a decrypting key of the first code pointer.

6. The print system according to claim 1,
    wherein the print executor comprises:
    a print permission requester which gives a request for print permission to the content server from the printer when the judging portion judges that the printer identifier included in the print job data coincides with its own printer identifier;
    a print permission transmitter which transmits print permission from the content server to the printer when the request for print permission is given from the printer; and
    a permitted print executor which executes print based on the print job data in the printer which has received the print permission.

7. The print system according to claim 6, wherein the content server encrypts the first code pointer.

8. The print system according to claim 6, wherein the content server encrypts the first code pointer and holds a code pointer decrypting key which is a decrypting key of the first code pointer.

9. The print system according to claim 8, wherein the print permission transmitter transmits the code pointer decrypting key as the print permission from the content server to the printer based on the request for the print permission from the printer.

10. The print system according to claim 9,
wherein the permitted print executor
decrypts the first code pointer with the code pointer decrypting key as the decrypting key to obtain the position of the next second copy guard code and sequentially obtain positions of subsequent second copy guard codes each based on a second code pointer of the preceding second copy guard code, and
executes print after removing these first and second copy guard codes in sequence.

11. The print system according to claim 1,
wherein the print job data generator generates the print job data with protection to prevent unjust copy,
wherein the print job data receiver temporarily stores the received print job data in an auxiliary memory of the printer without removing the protection, and
wherein the judging portion reads the print job data from the auxiliary memory.

12. The print system according to claim 11, wherein the print executor requests a protection removing key necessary to remove the protection from the content server only when the judging portion judges that the printer identifier included in the print job data coincides with its own printer identifier.

13. The print system according to claim 12, wherein when transmitting the printer specifying information to the content server, the printer encrypts the printer identifier and transmits the encrypted printer identifier as the printer specifying information.

14. The print system according to claim 12, wherein when transmitting the printer specifying information to the content server, the printer transmits the printer identifier as the printer specifying information without encrypting the printer identifier.

15. The print system according to claim 11, wherein the content server encrypts the first code pointer.

16. The print system according to claim 15, wherein a code pointer decrypting key which is a decrypting key of the encrypted first code pointer is held as the protection removing key in the content server.

17. The print system according to claim 11,
wherein the print job data generator
generates a third copy guard code including at least the printer specifying information and generates encrypted content data by encrypting the content data as the protection, and
generates the print job data with at least the third copy guard code and the encrypted content data.

18. The print system according to claim 17, wherein a content data decrypting key which is a decrypting key of the encrypted content data is held as the protection removing key in the content server.

19. A printer connected to a content server via a network, comprising:
a printer specifying information transmitter which transmits printer specifying information including a printer identifier to specify the printer based on a request from the content server, wherein the printer is selected by a client in the content server to which the client is connected;
a receiver which receives print job data having at least content data and the print specifying information including the printer identifier from the content server, wherein the content data is selected by the client in the content server;
a judging portion which reads the printer identifier included in the printer specifying information of the print job data and judges whether this printer identifier coincides with its own printer identifier or not; and
a print executor which executes print of the print job data only when the judging portion judges that the printer identifier included in the print job data coincides with its own printer identifier;
wherein the print job data includes at least one first copy guard code inserted at a specific position and one or a plurality of second copy guard codes inserted dispersively in the content data as required depending on a data length of the content data,
wherein the first copy guard code includes at least the printer specifying information and a first code pointer indicating a position of a next second copy guard code,
wherein the second copy guard codes each include at least a second code pointer which indicates a position of a second copy guard code next thereto, and
wherein the first and second code pointers are determined randomly every time these first and second code pointers are generated.

20. The printer according to claim 19, wherein when transmitting the printer specifying information to the content server, the printer specifying information transmitter encrypts the printer identifier and transmits the encrypted printer identifier as the printer specifying information.

21. The printer according to claim 19, wherein when transmitting the printer specifying information to the content server, the printer specifying information transmitter transmits the printer identifier as the printer specifying information without encrypting the printer identifier.

22. The printer according to claim 19, wherein the first code pointer is encrypted by the content server.

23. The printer according to claim 19, wherein the print executor comprises:
a print permission requester which requests print permission from the content server when the judging portion judges that the printer identifier included in the print job data coincides with its own printer identifier;
a print permission receiver which receives the print permission transmitted from the content server; and
a permitted print executor which executes print based on the print job data after receiving the print permission.

24. The printer according to claim 23, wherein the first code pointer is encrypted by the content server.

25. The printer according to claim 24, wherein the print permission receiver receives a code pointer decrypting key which is a decrypting key of the encrypted first code pointer as the print permission from the content server.

26. The printer according to claim 25,
wherein the permitted print executor
decrypts the first code pointer with the code pointer decrypting key as the decrypting key to obtain the position of the next second copy guard code and sequentially obtain positions of subsequent second copy guard codes each based on a second code pointer of the preceding second copy guard code, and executes print after removing these first and second copy guard codes in sequence.

27. The printer according to claim 23, wherein when transmitting the printer specifying information to the content server, the printer specifying information transmitter encrypts the printer identifier and transmits the encrypted printer identifier as the printer specifying information.

28. The printer according to claim 23, wherein when transmitting the printer specifying information to the content server, the printer specifying information transmitter transmits the printer identifier as the printer specifying information without encrypting the printer identifier.

29. The printer according to claim 19,
wherein the print job data is given protection to prevent unjust copy,
wherein the print job data received from the content server is temporarily stored in an auxiliary memory of the printer without the protection being removed, and
wherein the judging portion reads the print job data from the auxiliary memory.

30. The printer according to claim 29, wherein the print executor requests a protection removing key necessary to remove the protection from the content server only when the judging portion judges that the printer identifier included in the print job data coincides with its own printer identifier.

31. The printer according to claim 29, wherein when transmitting the printer specifying information to the content server, the printer specifying information transmitter encrypts the printer identifier and transmits the encrypted printer identifier as the printer specifying information.

32. The printer according to claim 29, wherein when transmitting the printer specifying information to the content server, the printer specifying information transmitter transmits the printer identifier as the printer specifying information without encrypting the printer identifier.

33. The printer according to claim 29, wherein the first code pointer is encrypted by the content server and a decrypting key of this encryption is used as a protection removing key necessary to remove the protection.

34. A content server, comprising:
a content database which collects a plurality of kinds of content original data;
a reader which reads content original data of a kind selected by a user as content data from the content database;
a printer specifying information requester which requests transmission of printer specifying information to a printer which is selected by the client, wherein the printer is connected to the content server and the printer specifying information includes a printer identifier to specify the printer;
a printer specifying information receiver which receives the printer specifying information from the printer;
a print job data generator which generates print job data including at least the content data and the printer specifying information based on the content data read by the reader and the received printer specifying information; and
a print job data transmitter which transmits the print job data to the printer,
wherein the print job data includes at least one first copy guard code inserted at a specific position and one or a plurality of second copy guard codes inserted dispersively in the content data as required depending on a data length of the content data,
wherein the print job data generator comprises:
a first copy guard code generator which generates the first copy guard code including at least the printer specifying information and a first code pointer indicating a position of a next second copy guard code and inserts the first copy guard code at the specific position; and
a second copy guard code generator which, when the content data exists at a position indicated by the first code pointer, inserts a second copy guard code including at least a second code pointer which indicates a position of a second copy guard code next to the next second copy guard code at the position, and repeats the insertion of the second copy guard codes until the entire length of the content data is covered, and
wherein the first and second code pointers are determined randomly every time these first and second code pointers are generated.

35. The content server according to claim 34, further comprising a first encryptor which encrypts the first code pointer.

36. The content server according to claim 34, further comprising a second encryptor which encrypts the first code pointer and holds a code pointer decrypting key which is a decrypting key of the first code pointer in the content server.

37. The content server according to claim 34,
wherein a request for print permission is transmitted from the printer to the content server only when the printer identifier included in the printer specifying information of the print job data coincides with a printer identifier of the printer's own, and
wherein print permission is transmitted to the printer when the request for print permission is received.

* * * * *